United States Patent [19]
Peltola et al.

[11] Patent Number: 5,178,345
[45] Date of Patent: * Jan. 12, 1993

[54] EXTENDIBLE AND RETRACTABLE AIRCRAFT SEAT ASSEMBLY

[75] Inventors: Wallace A. Peltola, Redmond; Peter J. Arnold, Seattle, both of Wash.

[73] Assignee: The Boeing Company, Seattle, Wash.

[*] Notice: The portion of the term of this patent subsequent to Apr. 14, 2009 has been disclaimed.

[21] Appl. No.: 754,654

[22] Filed: Sep. 4, 1991

Related U.S. Application Data

[63] Continuation-in-part of Ser. No. 482,197, Feb. 20, 1990, Pat. No. 5,104,065.

[51] Int. Cl.⁵ ............................................. B64D 11/06
[52] U.S. Cl. ................................ 244/118.6; 244/122 R; 297/232
[58] Field of Search ................ 244/118.6, 122 R; 297/118, 130, 232, 257, 236; 276/65.1

[56] References Cited

U.S. PATENT DOCUMENTS

| | | | |
|---|---|---|---|
| 2,758,872 | 8/1956 | Solomon et al. | 296/65 |
| 3,145,052 | 8/1964 | Morgan | 297/354 |
| 3,380,561 | 4/1968 | Porter | 188/96 |
| 3,637,253 | 1/1972 | Maule et al. | 296/65 |
| 3,659,684 | 5/1972 | Porter | 188/322 |
| 3,760,911 | 9/1973 | Porter et al. | 188/300 |
| 3,860,098 | 1/1975 | Porter et al. | 188/300 |
| 3,874,480 | 4/1975 | Porter et al. | 188/67 |
| 3,893,729 | 7/1975 | Sherman et al. | 297/118 |
| 4,155,433 | 5/1979 | Porter | 188/300 |
| 4,533,175 | 8/1985 | Brennan | 297/232 |
| 4,765,678 | 8/1988 | Huang | 297/236 |
| 4,768,832 | 9/1988 | Wain | 297/414 |
| 4,881,702 | 11/1989 | Slettebak | 244/188.6 |
| 4,917,438 | 4/1990 | Morgan | 297/411 |
| 5,037,157 | 8/1991 | Wain et al. | 297/194 |

FOREIGN PATENT DOCUMENTS 335018 10/1959 European Pat. Off.
1037972 8/1966 United Kingdom.

Primary Examiner—Joseph F. Peters, Jr.
Assistant Examiner—Christopher P. Ellis
Attorney, Agent, or Firm—Delbert J. Barnard

[57] ABSTRACT

An aircraft seat assembly (14) is convertible between three seats (LA, LM, LW) with a first seat width and two seats (LA, W) with a second wider seat width. The seat assembly includes a tube-in-tube support frame for the seats which allows the conversion to be accomplished by a simple sliding movement of the aisle and middle seat frames towards and away from the window seat frame which is fixed in position. Movement of the aisle and middle seat frames automatically changes the position of the two inside armrests (22, 24). The middle seat back frame (66) is vertically split into parts (66A, 66B). Movement of the seat frames from the three-seat configuration to the two-seat configuration disconnects seat back parts (66A, 66B) from each other and locks one part (66A) to the window seat back frame (64) and the other part (66B) to the aisle seat back frame (68). Movement of the seat frames in the opposite direction disconnects the parts (66A, 66B) from the window and aisle seat back frames (64, 68) and connects the two parts (66A, 66B) together to provide a unified seat back frame (66) for the middle seat (LM). A lock mechanism (124, 130) locks the seat frame parts together, both in the three-seat configuration and in the two-seat configuration. The lock mechanism is locked and unlocked by movement of a handle (H) located at the aisle end of the aisle seat (LA). A key lock (160) is provided to keep the lock mechanism (124, 130) locked in between authorized and intended movements of the seat frames to convert the seat assembly (14).

25 Claims, 18 Drawing Sheets

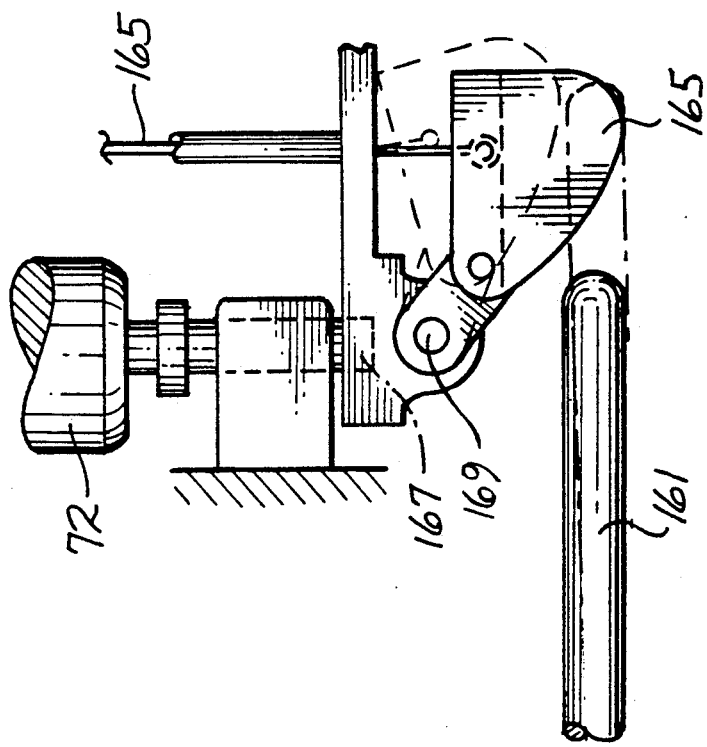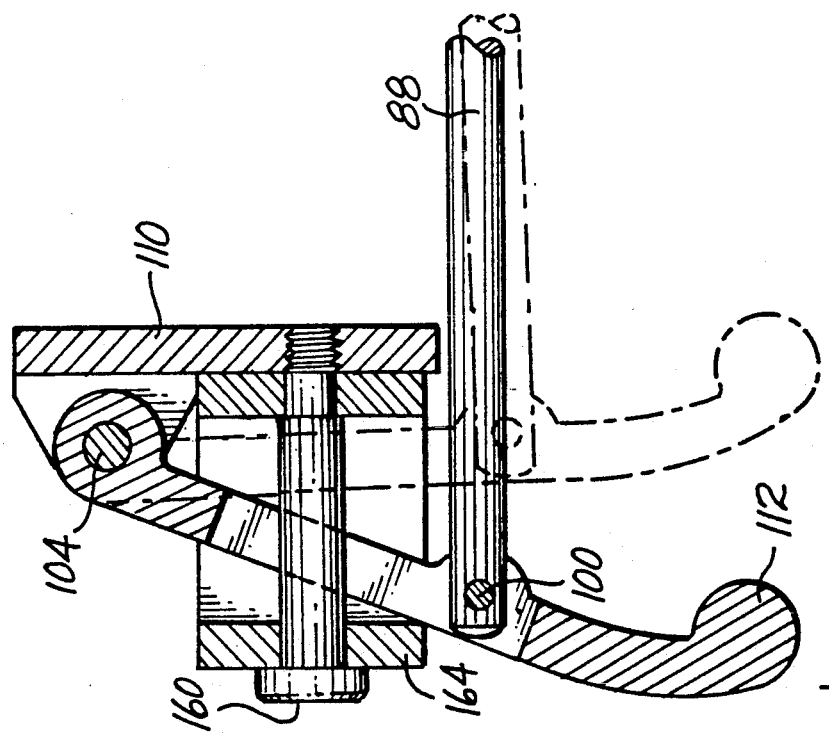
Fig. 11

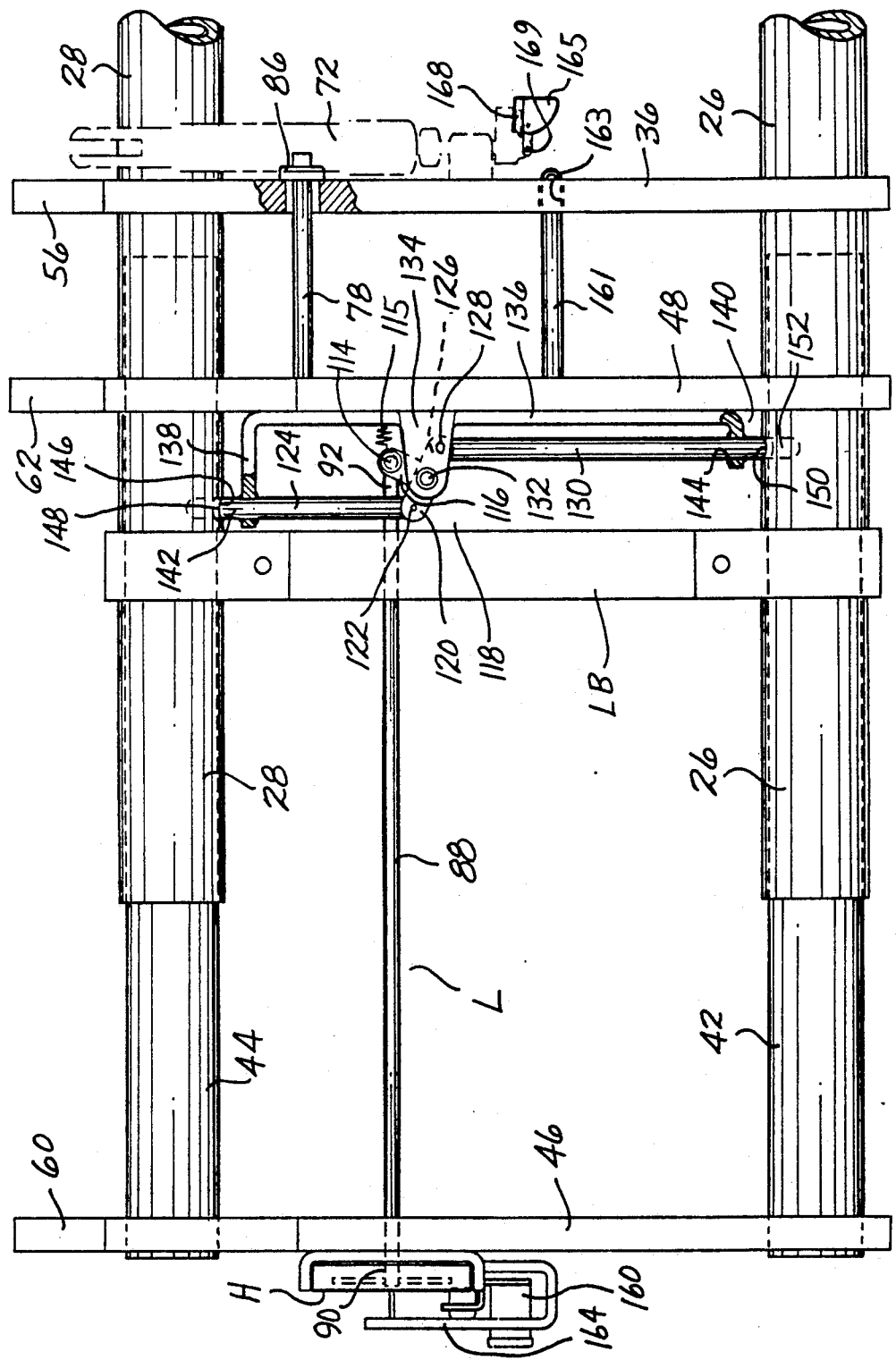

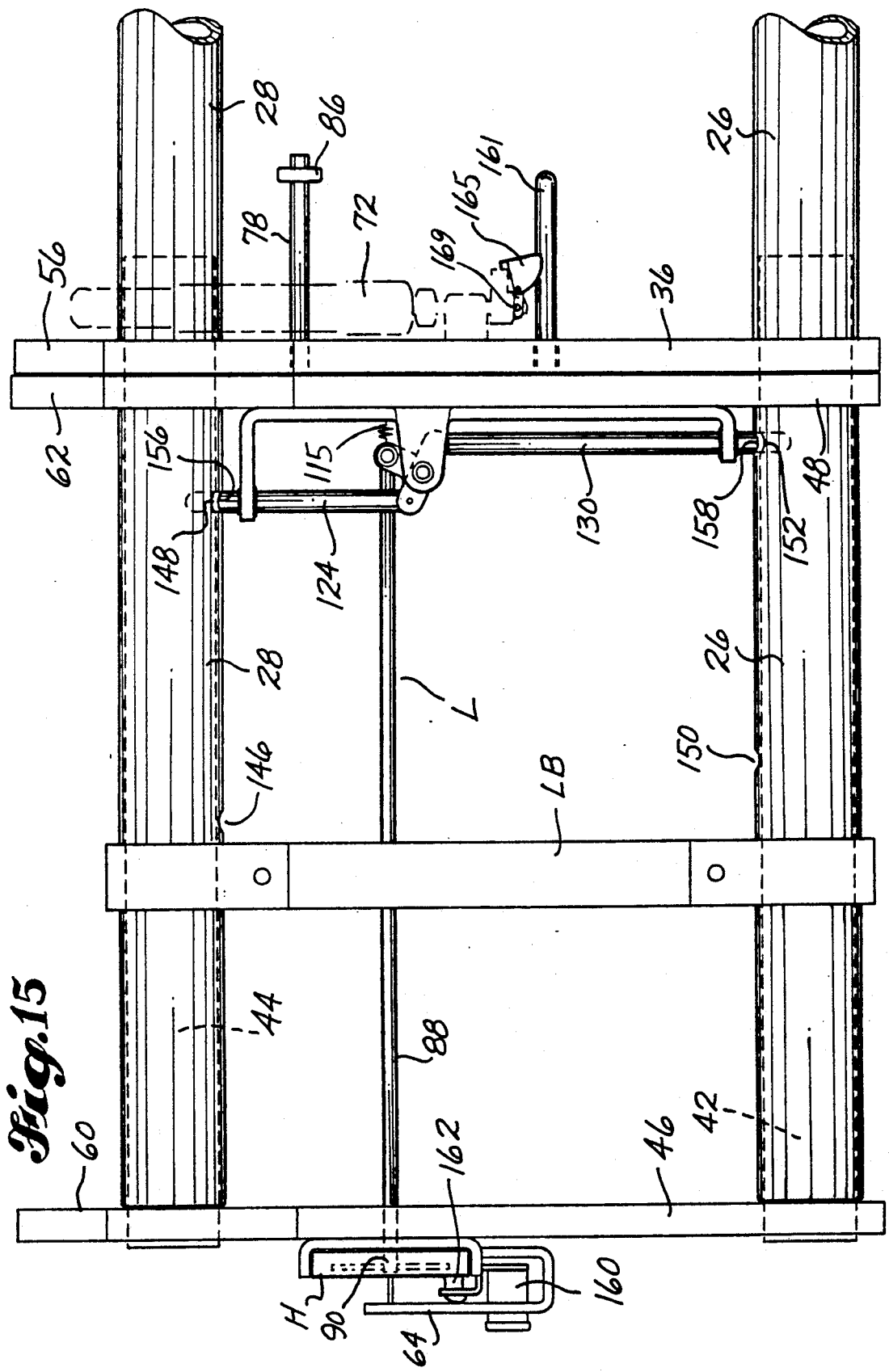

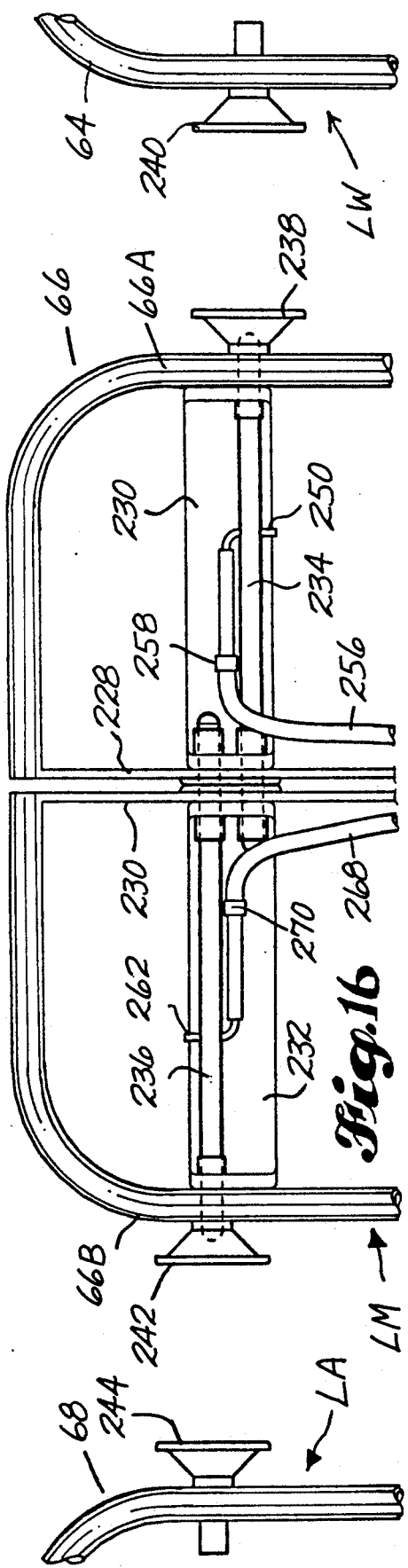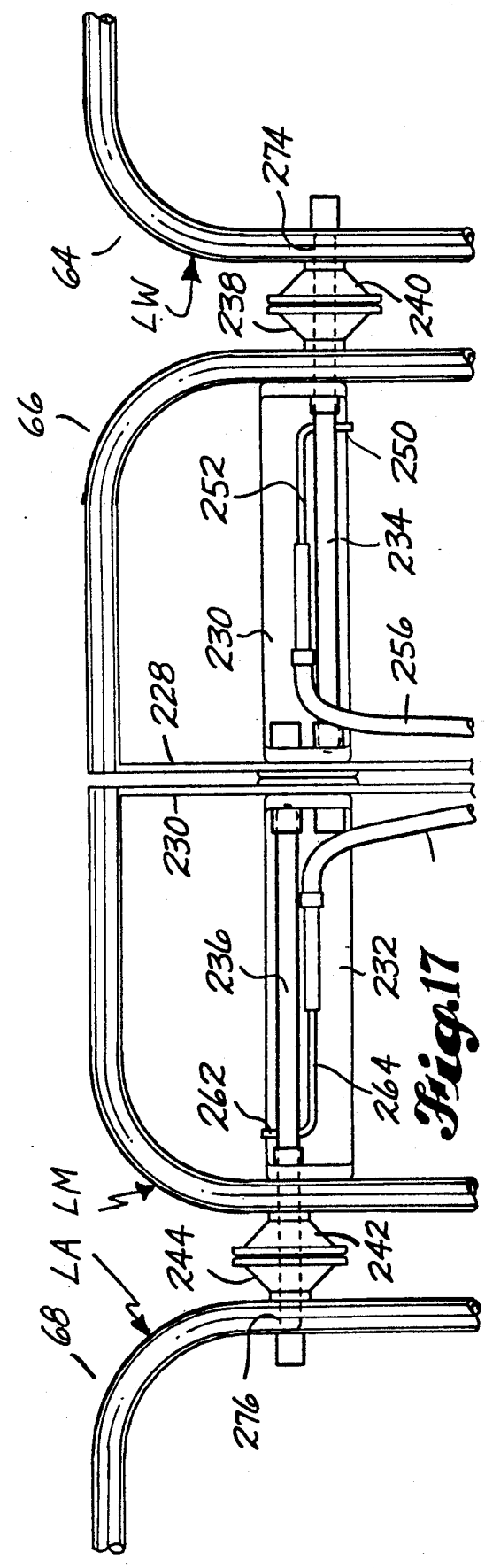

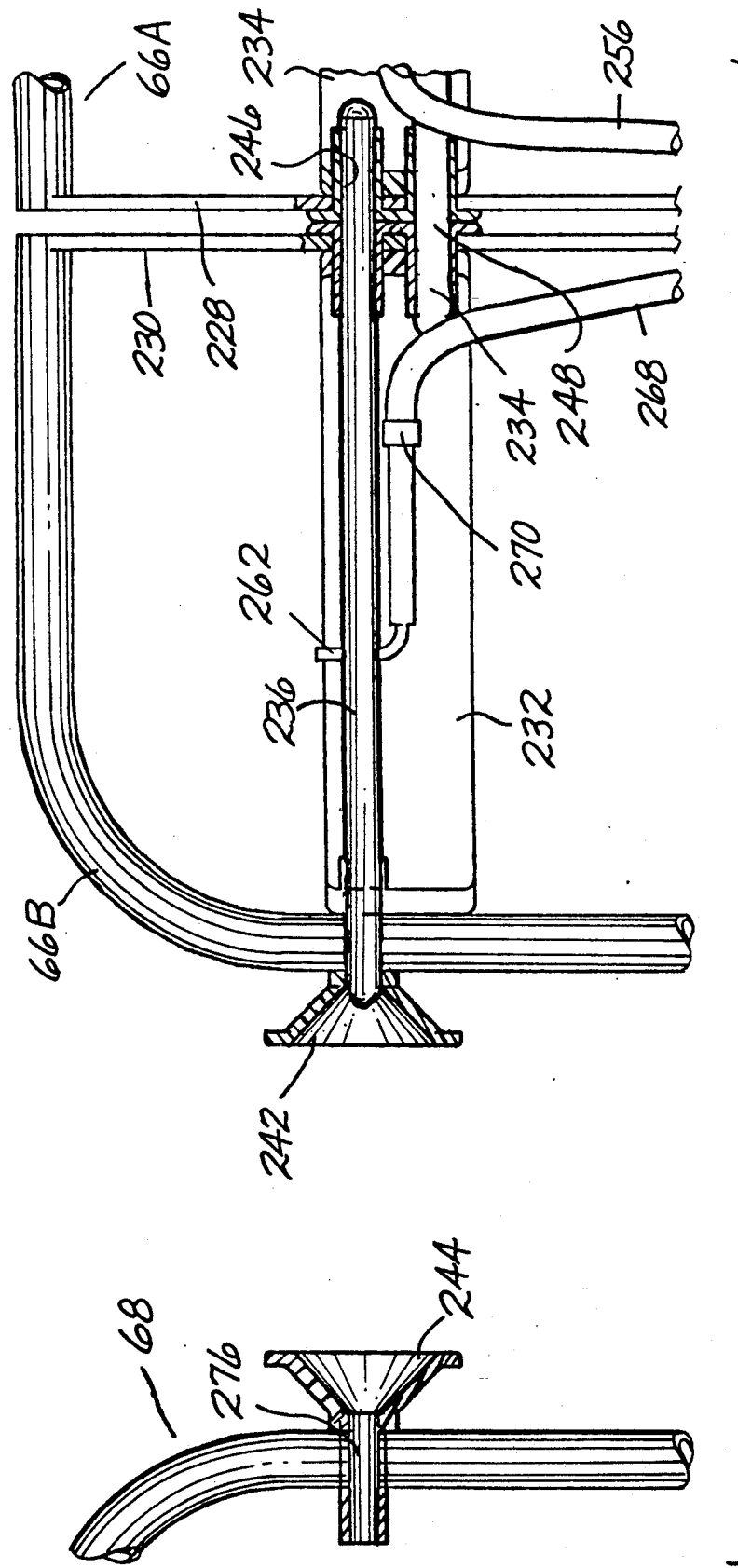

EXTENDIBLE AND RETRACTABLE AIRCRAFT SEAT ASSEMBLY

RELATED APPLICATIONS

This is a continuation-in-part of U.S. Ser. No. 07/482,197, entitled Readily Convertible Aircraft Passenger Seats, filed Feb. 20, 1990, issued Apr. 14, 1992, U.S. Pat. No. 5,104,065, by Donald R. Daharsh et al., and assigned to The Boeing Company.

TECHNICAL FIELD

This invention relates to passenger seats on an aircraft. More particularly, it relates to the provision of seat assemblies which are constructed to be extendible and retractable for changing the number and width of the individual seats in a row of seats.

BACKGROUND ART

Commercial airlines will from time to time change the passenger seating in a given airplane. This is usually done by removing the existing seats and replacing them with new seats of a different size. Changing the seating in this manner requires considerable time and is usually performed when the aircraft is out of service.

U.S. Pat. No. 4,881,702, granted Nov. 21, 1989, to Richard J. Slettebak, provides a seat construction which permits a change in the seating configuration by making adjustments to a permanent seat structure Specifically, this patent discloses seat assemblies which are convertible between seven seats in a row and six wider seats in the same row. The above mentioned U.S. application Ser. No. 07/482,197 discloses a passenger seat construction which permits a change in seating between six seats in a row and five wider seats in the same row. Each row of seats is composed of two-seat assemblies separated by an aisle. One of the assemblies is convertible between three seats of a first seat width and three seats of a wider seat width. The other assembly is convertible between three seats of a first seat width and two seats of a wider seat width.

The present invention relates primarily to improvements in the three to two seat assembly. However, some aspects of the present invention are usable in the three to three seat assembly, and in other seat assemblies composed of movable and fixed frame portions. A principal object of the present invention is to provide control mechanisms which automatically reposition the seat assembly components in response to a simple push or pull imposed on a movable aisle seat frame portion of the seat assembly.

DISCLOSURE OF THE INVENTION

One aspect of the invention is to provide an aircraft passenger seat assembly which is composed of a fixed window frame portion, a movable middle frame portion, and a movable aisle frame portion. The middle frame portion is movable against the window frame portion, and the aisle frame portion against the middle frame portion, to position the seat assembly into a first configuration. The middle frame portion is moved away from the window frame portion, and the aisle frame portion away from the middle frame portion, to position the seat assembly into the second configuration.

According to an aspect of the invention, a lock means is provided for locking the movable frame portions against movement, following movement of such frame portions into a selected one of the said seat configurations. In preferred form, the lock means is accessible from the aisle end of the aisle seat. It includes a handle that is pivotally connected to an aisle end portion of the aisle seat frame. An upward pull on the handle pulls a control member endwise. The control member movement rotates a linkage which in turn retracts a lock bolt bracket or bolt bracket, moving it into an unlocked position. This is followed by a pull on the handle or a push on the aisle seat, to shift the movable aisle and middle frame portions in position, to change the seat assembly configuration.

According to another aspect of the invention push/pull control elements automatically change the position of the interior two armrests, in response to movement of the aisle and middle seat frame portions.

According to a further aspect of the invention, the middle seat frame portion includes a middle seat back frame composed of two parts. The two parts are connected together when the seat assembly is in the three-seat configuration. When the seat assembly is in its two-seat configuration, the first part is connected to the window seat back frame and the second part is connected to the aisle seat back frame. According to yet another aspect of the invention, the seat back parts are locked to each other, or to the adjoining seat back frames, by slidable lock bolts. And, the seat assembly includes push/pull control elements which automatically move the lock bolts in response to movement of the movable aisle and middle seat frame portions. A pull on the aisle seat frame portion will move the aisle seat frame portion away from the middle seat frame portion and the middle seat frame portion away from the fixed window seat frame portion. At the same time, the push/pull control will disconnect the two parts of the middle seat back frame from each other and connect the first part to the window seat back frame and the second part to the aisle seat back frame. A push on the aisle seat frame portion will move the aisle seat frame portion against the middle seat frame portion and the middle seat frame portion against the window seat frame portion. At the same time, the push/pull control will disconnect the middle seat back parts from each other and connect the part adjacent the window seat to the window seat back frame and the part adjacent the aisle seat to the aisle seat back frame.

According to yet another aspect of the invention, stops are provided to establish an end to the movement of the movable aisle and middle seat frame portions, in both directions. The seat assembly can be easily moved into the two-seat configuration by pushing on the aisle seat frame portion until the stops make contact and the middle seat frame portion and the aisle seat frame portion stop moving. The handle can then be pushed or allowed to spring downwardly to lock the movable frame portions against further movement. The seat assembly can be easily and quickly moved into the three-seat configuration by a pull on the handle until other stops make contact and the aisle seat frame portion and the middle seat frame portion stop moving. The handle can then be moved or allowed to spring downwardly to lock the movable frame portions in position. Movement of the aisle and middle seat frame portions together and against the window seat frame automatically disables the recline control for the middle seat.

Yet another aspect of the invention is to provide a seat assembly which is convertible between a three-seat configuration and a two-seat configuration with a wider seat width, and which is provided with service trays on the backs of the seats which are usable in either configuration of the seat assembly.

Other objects, features, and advantages of the invention are hereinafter described in the description of the best mode.

BRIEF DESCRIPTION OF THE DRAWINGS

Like reference numerals are used to designate like parts throughout the several views of the drawing, and:

FIG. 11 is an elevational view of the mechanism shown by FIG. 10, such view including a solid line showing of the handle in an unlocked position, a broken line showing of the handle in a locked position, and showing a disable cam and pin for the middle seat recline unit;

FIG. 14 is an enlarged scale fragmentary top plan view of the seat portion of the aisle seat support frame, showing parts of the positioning mechanism, such view showing the parts in a three-seat configuration;

FIG. 15 is a view like FIG. 14, but showing the parts in a two-seat configuration;

FIG. 16 is a fragmentary elevational view of the upper portions of the upper frame structure, showing the parts in a three-seat configuration;

FIG. 17 is a view like FIG. 16, but showing the parts in a two-seat configuration;

FIG. 18 is an enlarged scale fragmentary sectional view of a mechanism which locks the two parts of the middle seat back frame together, or each to the seat back frame of an adjacent seat back frame, such view showing the two sections of the center seat back frame locked together;

BEST MODE FOR CARRYING OUT THE INVENTION

Figure 1:
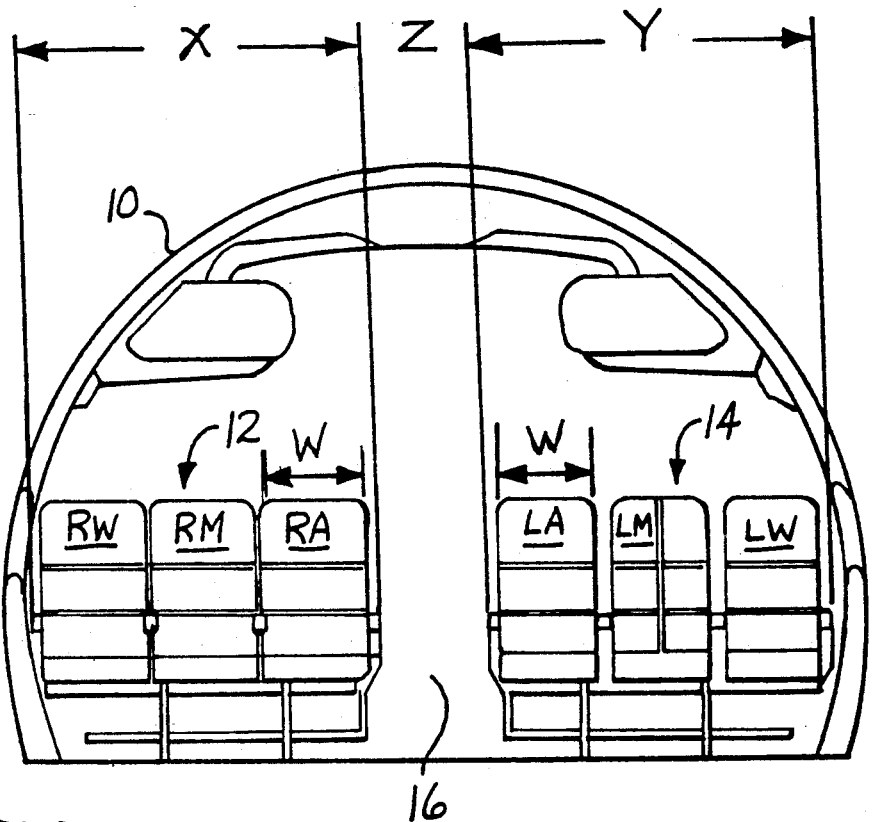
FIG. 1 is a sectional view through the passenger compartment of an aircraft presenting a front elevational view of a row of six seats, three seats on each side of a center aisle.
Figure 2:
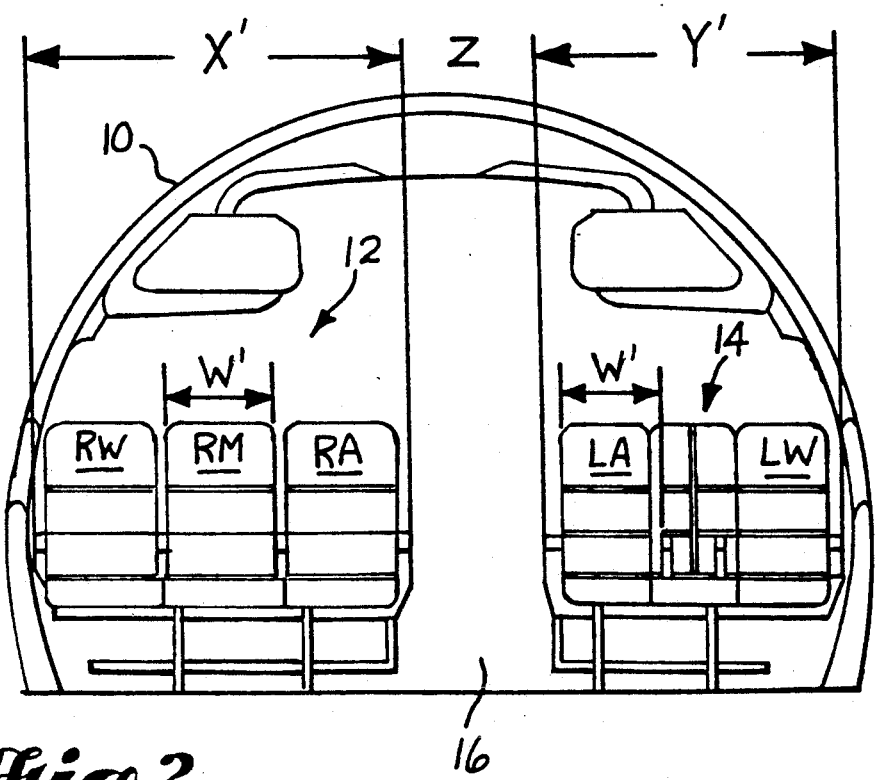
FIG. 2 is a view like FIG. 1, but showing the same seat structure after it has been converted to a row of five business class seats, three seats on one side of the aisle and two seats on the opposite side of the aisle.

Referring to FIGS. 1 and 2, a passenger compartment portion of an aircraft body 10 is shown in cross-section. An extendible/retractable first seat assembly 12 is provided on one side of an aisle (e.g. the right side) and an extendible/retractable second seat assembly 14 is provided on the second side of the aisle (e.g. the left side). Together these seat assemblies 12, 14 provide a row of seats which includes a center aisle 16. In FIG. 1, the right side seat assembly is retracted and the left side seat assembly 14 is extended. This configuration of the two seat assemblies 12, 14 provides six seats in the row, three seats on each side of the center aisle 16. In this configuration, the seat width W, measured between armrests, is substantially the same for each seat. By way of example the width X of seat assembly 12 may be fifty-nine inches and the width Y of seat assembly 14 may also be about fifty-nine inches. The seat width W may be about seventeen inches. FIG. 2 shows the right side seat assembly 12 extended, the left side seat assembly 14 retracted, and the armrests repositioned so as to define five seats in the row with a wider seat width W'. In this configuration, width X' of the disclosed embodiments is about sixty-five inches and width Y' is about fifty-three inches. Width W' is about nineteen inches. The width Z of aisle 16 is substantially the same for both configurations of the seats (e.g. twenty inches), but in the six-seat configuration, the aisle 16 is substantially centered whereas in the five-seat configuration, the aisle 16 is offset from center towards the left side of the aircraft. The present invention relates to a construction of the three to two seat assembly, i.e. the left side seat assembly 14 in the preferred embodiment.

Referring to FIGS. 3-6, the left side seat assembly 14 includes a support base LB which is fixed to the cabin floor. A seat cushion support frame is supported on and by the support base LB. This seat assembly comprises three side-by-side seat cushions. The seat cushions are pictured in FIGS. 1 and 2. In the other figures the seat cushions are omitted for the purpose of exposing the supporting frame structure. The seat cushions are supported on and by the seat cushion support frame. However, in one configuration of the seat assembly 14, three seats are defined. In the second configuration, only two seats are defined. The three seats are designated LA, LM, LW. The two-seat configuration only includes seats LA and LW. Each seat cushion includes an upper back rest portion and a lower seat portion.

An aisle armrest 18 is fixed in position on the aisle side of seat LA. A window armrest 20 is fixed in position on the window side of seat LW. Armrest 22, positioned between the aisle seat LA and the middle seat LM, and armrest 24, positioned between the middle seat LM and the window seat LW, are movable in position. Armrest 22 may be referred to as the "aisle/middle armrest" and armrest 24 may be referred to as the "middle/window armrest."

Figure 3:
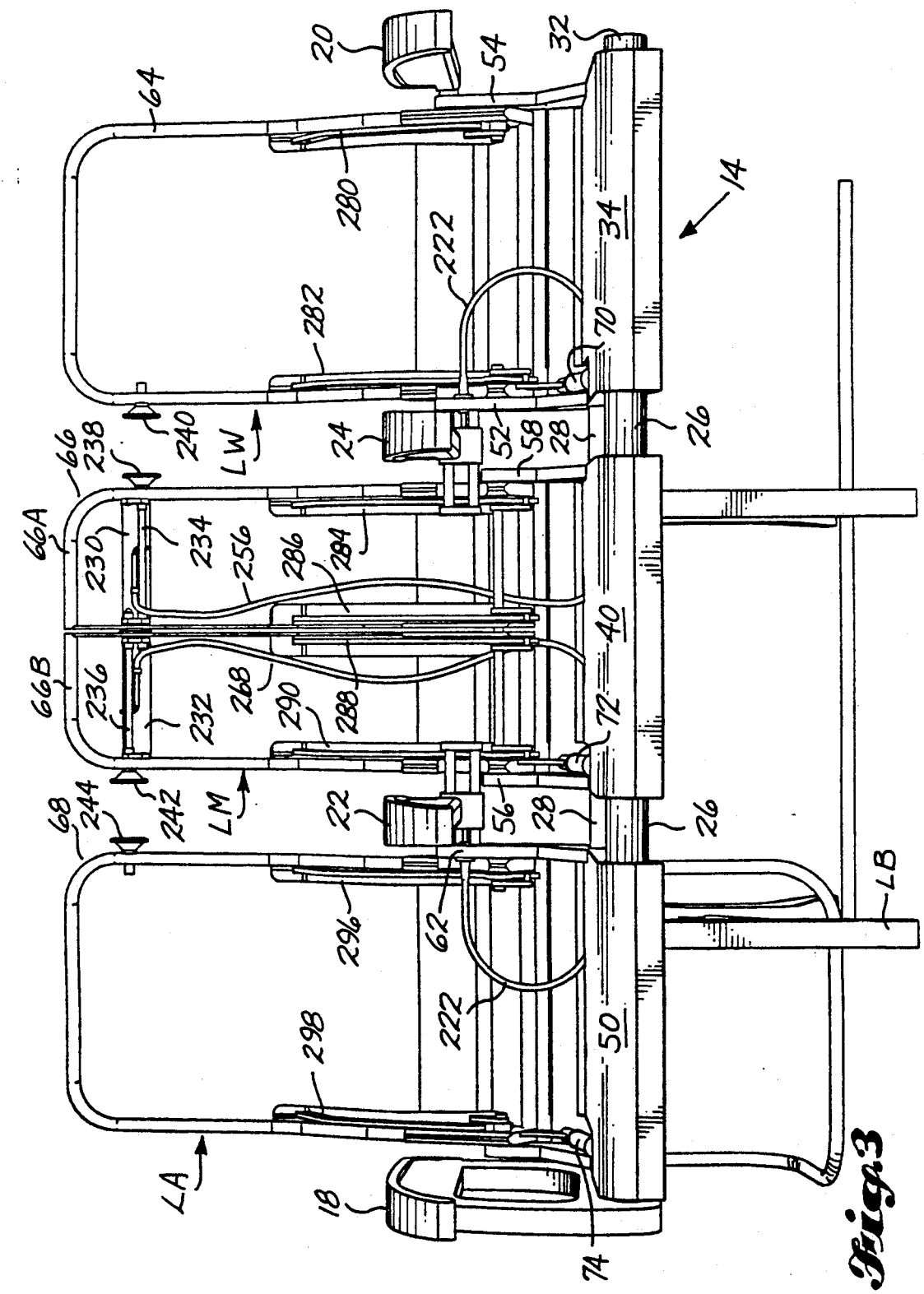
FIG. 3 is a front pictorial view of frame portions of a seat assembly which is adjustable between a two-seat configuration and a three-seat configuration, such view showing the frame structure in a three-seat configuration.
Figure 4:
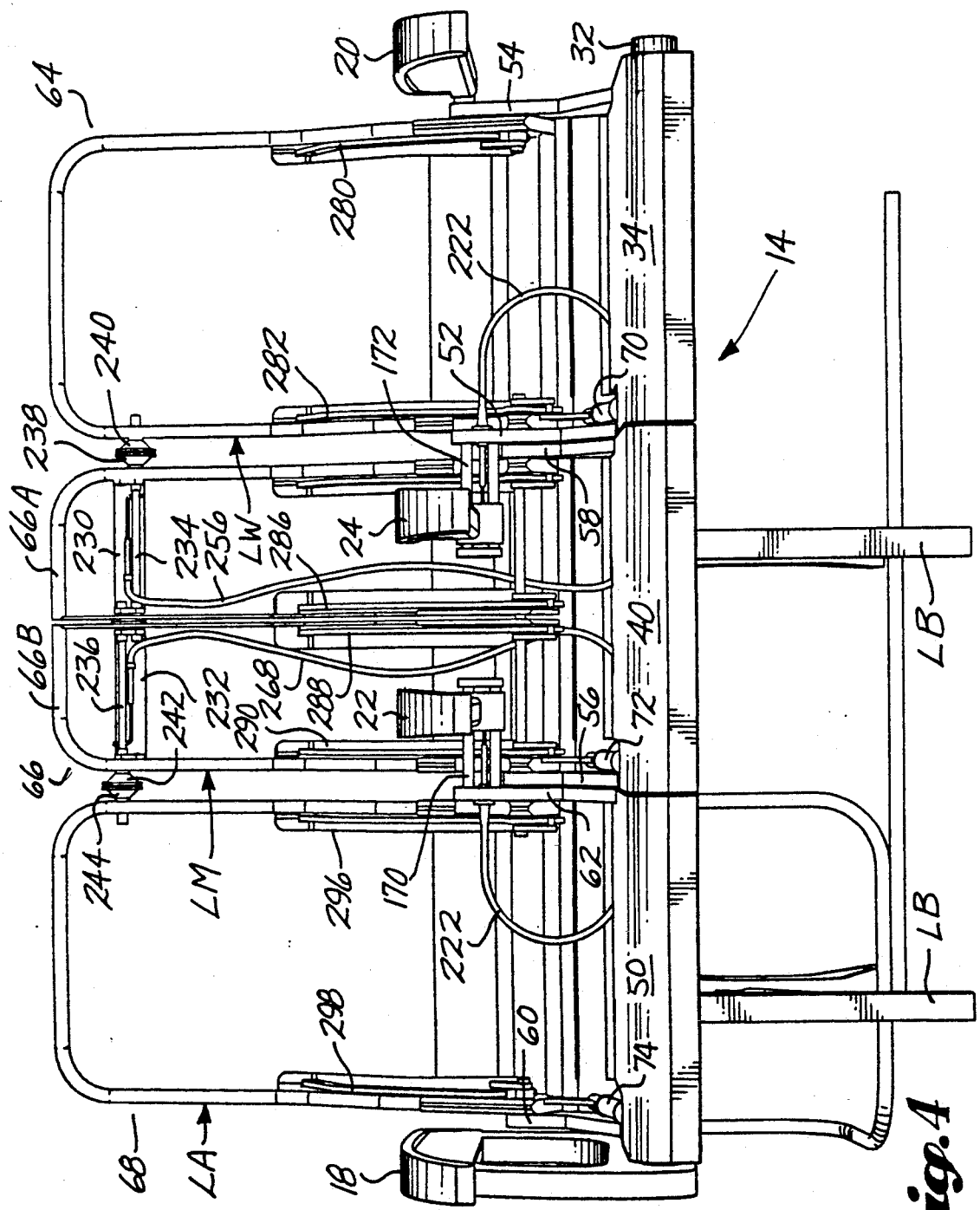
FIG. 4 is a view like FIG. 3, but showing the frame structure in a two-seat configuration.
Figure 8:
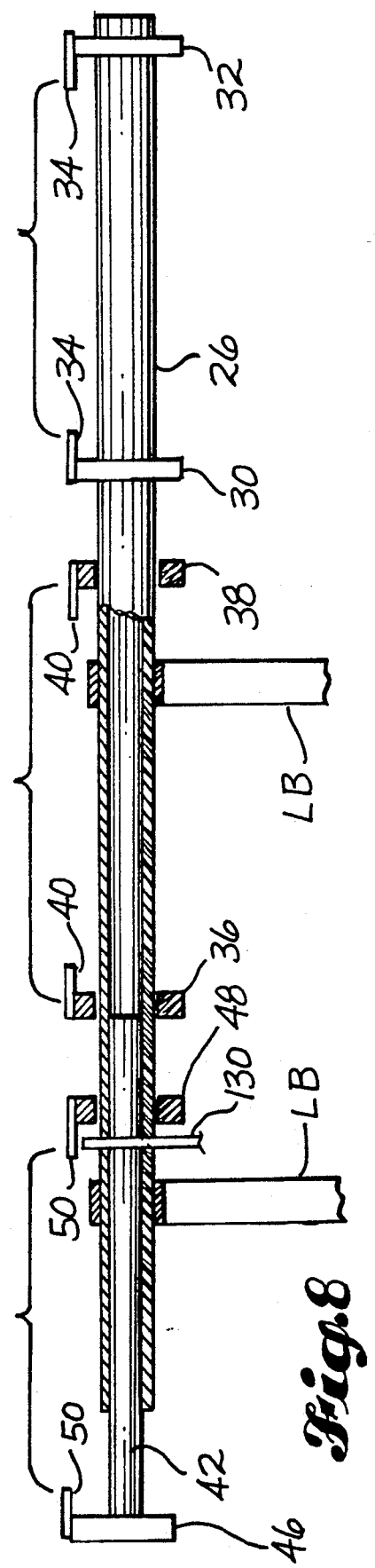
FIG. 8 is a longitudinal sectional view of the forward portion of the lower seat frame structure, taken substantially along line 8,9—8,9 of FIG. 7, showing fixed and movable parts of such structure.
Figure 9:
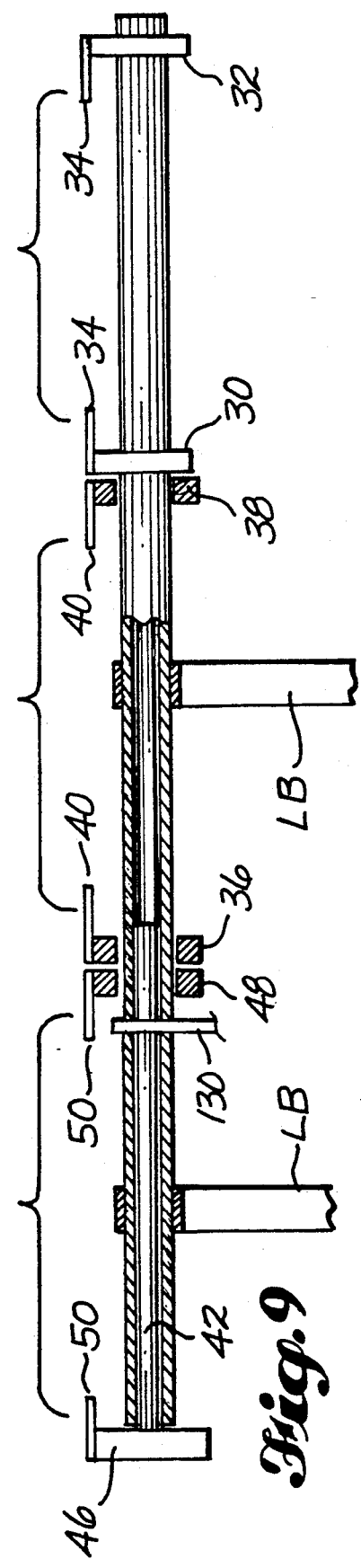
FIG. 9 is a view like FIG. 8, showing the frame parts in a retracted position.
Figure 21:
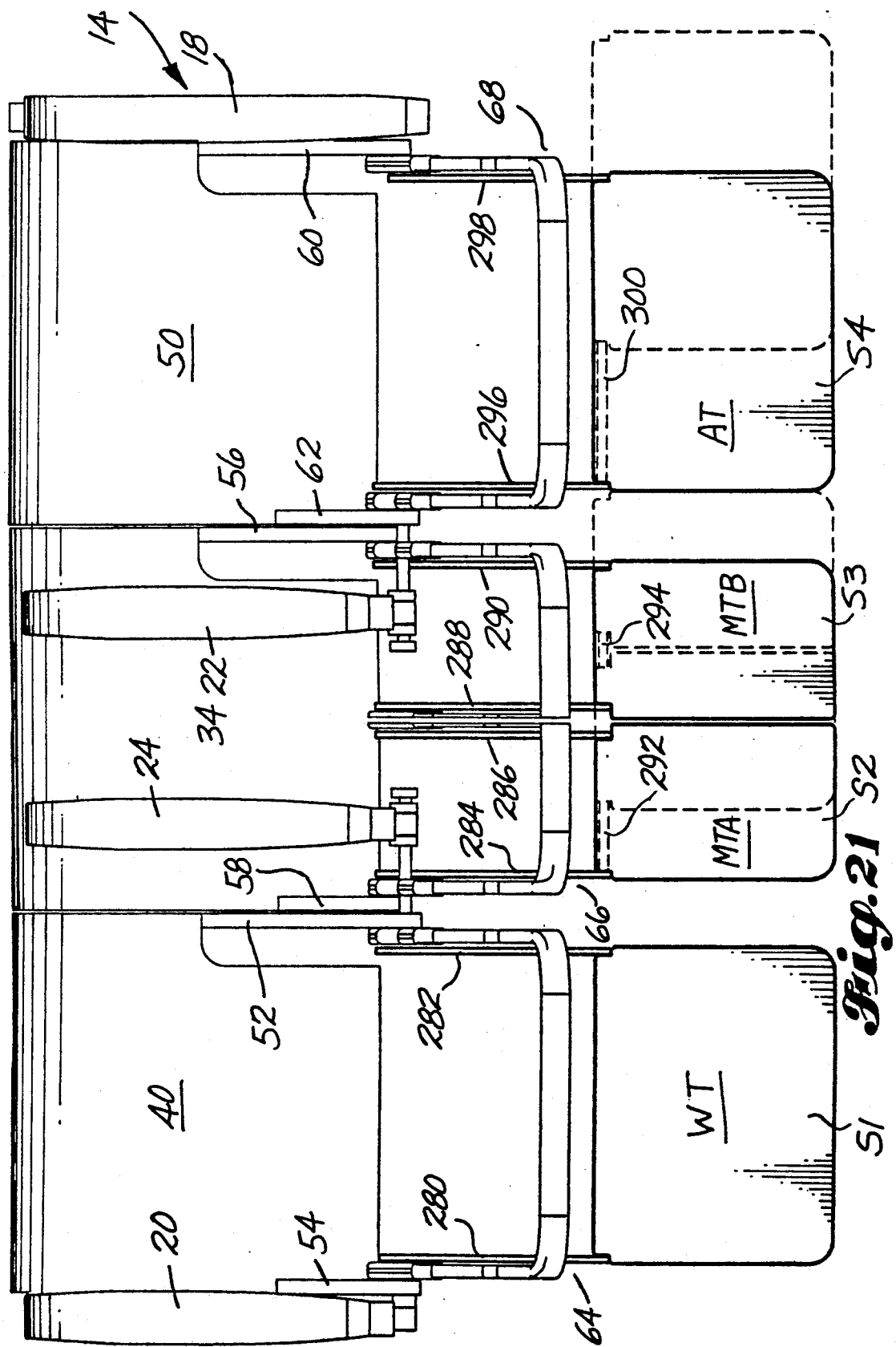
FIG. 21 is a top plan view of the seat assembly, showing the seat trays in a down position, and including a solid line showing of the trays in a three-seat configuration and a broken line showing of the trays in a two-seat configuration.

Referring to FIGS. 8 and 9, the lower portion of the seat cushion support frame is basically characterized by front and rear main frame members 26, 28. In preferred form, members 26, 28 are parallel tubes of equal length secured to upper portions of the base structure LB. The lower part of the window seat frame portion is defined by spaced apart frame members 30, 32 which are fixed to tubes 26, 28, and by the portions of the tubes 26, 28 which extend between frame members 30, 32. As shown in FIGS. 2, 3 and 21, a sheet metal top 34 interconnects frame members 30, 32. The lower part of the middle seat frame portion includes spaced apart frame members 36, 38 which are mounted to move back and forth on the tubes 26, 28. Members 36, 38 are connected together by a sheet metal top member 40 (FIGS. 3 and 4). At the aisle end of the seat assembly, there are two smaller diameter tubes 42, 44 which are telescopically received within the aisle end portions of tubes 26, 28. At their outer ends, tubes 42, 44 are connected together by a frame member 46. A second frame member 48 is positioned to travel back and forth along the tubes 26, 28. A sheet metal top member 50 connects frame members 46, 48.

Figure 7:
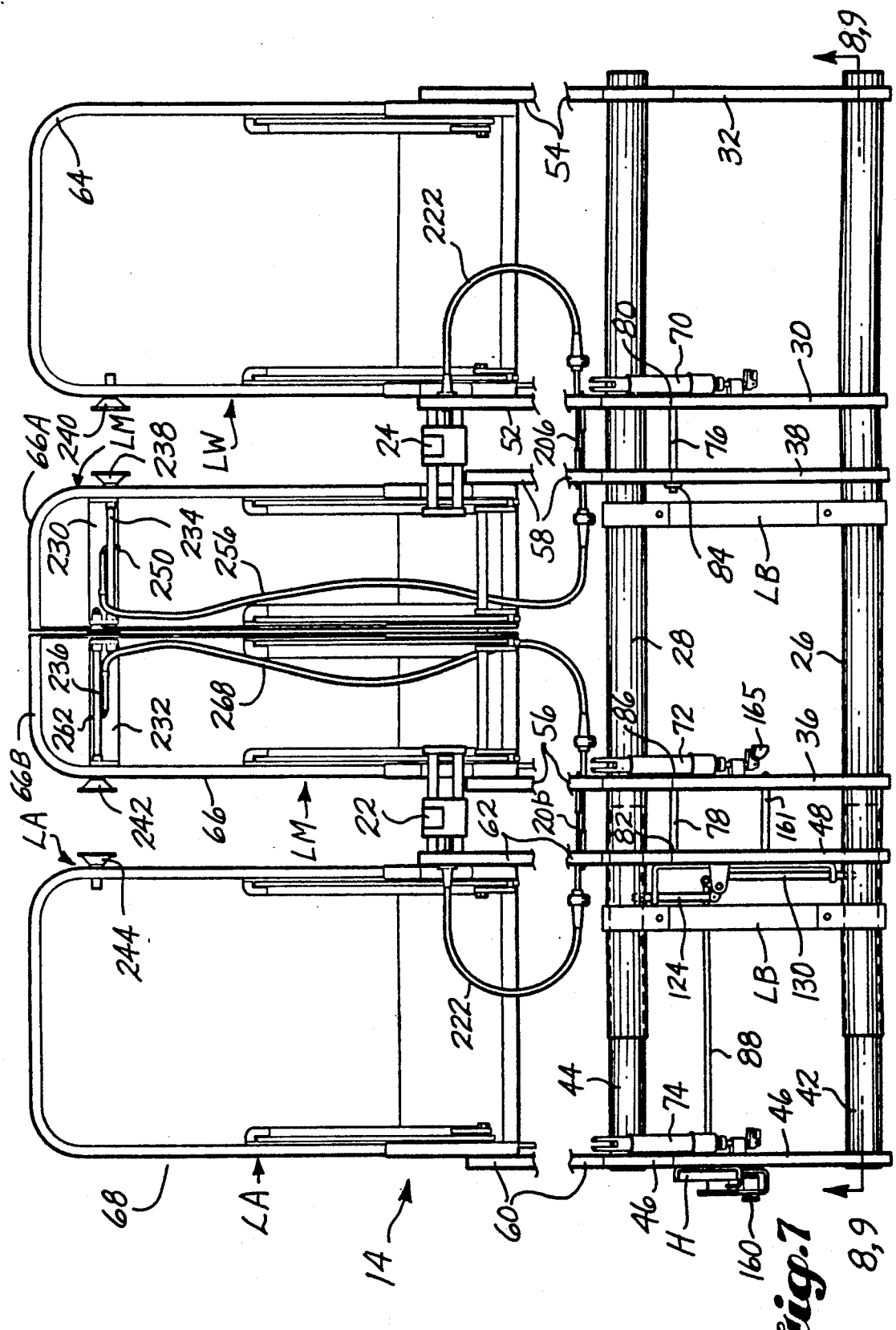
FIG. 7 is a plan view of the lower frame structure below the cushions on which the passengers sit, combined with an elevational view of the upper frame structure behind the seat back cushions, such view showing the frame structure in the three-seat configuration.

As shown by FIGS. 7-9 in particular, the frame members 26, 28, 30, 32 never move. Frame members 36, 38 (and top member 40, not shown) move back and forth between the position shown in FIG. 8 and the position shown in FIG. 9. Frame members 42, 44, 46, 48 (and top member 50, not shown) move back and forth between the position shown in FIG. 8 and the position shown in FIG. 9.

FIG. 9 shows the position of the frame parts when the seat assembly is in its two-seat configuration. Frame members 30, 38 make contact and frame members 36, 48 make contact, to establish the retracted end of travel position of the movable frame members.

Frame members 30, 32, 34, 36, 38 have upstanding rear portions 52, 54, 56, 58, 60, 62 which serve to mount seat back frames 64, 66, 68. The hinge structures used for connecting the seat back frame 64, 66, 68 to the frame portions 52, 54, 56, 58, 60, 62 are conventional and are not a part of the invention. Each seat frame includes a recline mechanism 70, 72, 74 which controls the angular position of the seat back frame 64, 66, 68. Mechanisms 70, 72, 74 are standard and for that reason will not be described except for recline unit 72. Recline unit 72 is disabled when the seat assembly is in its two-seat configuration. The disabling mechanism will be hereinafter described.

Figure 12:
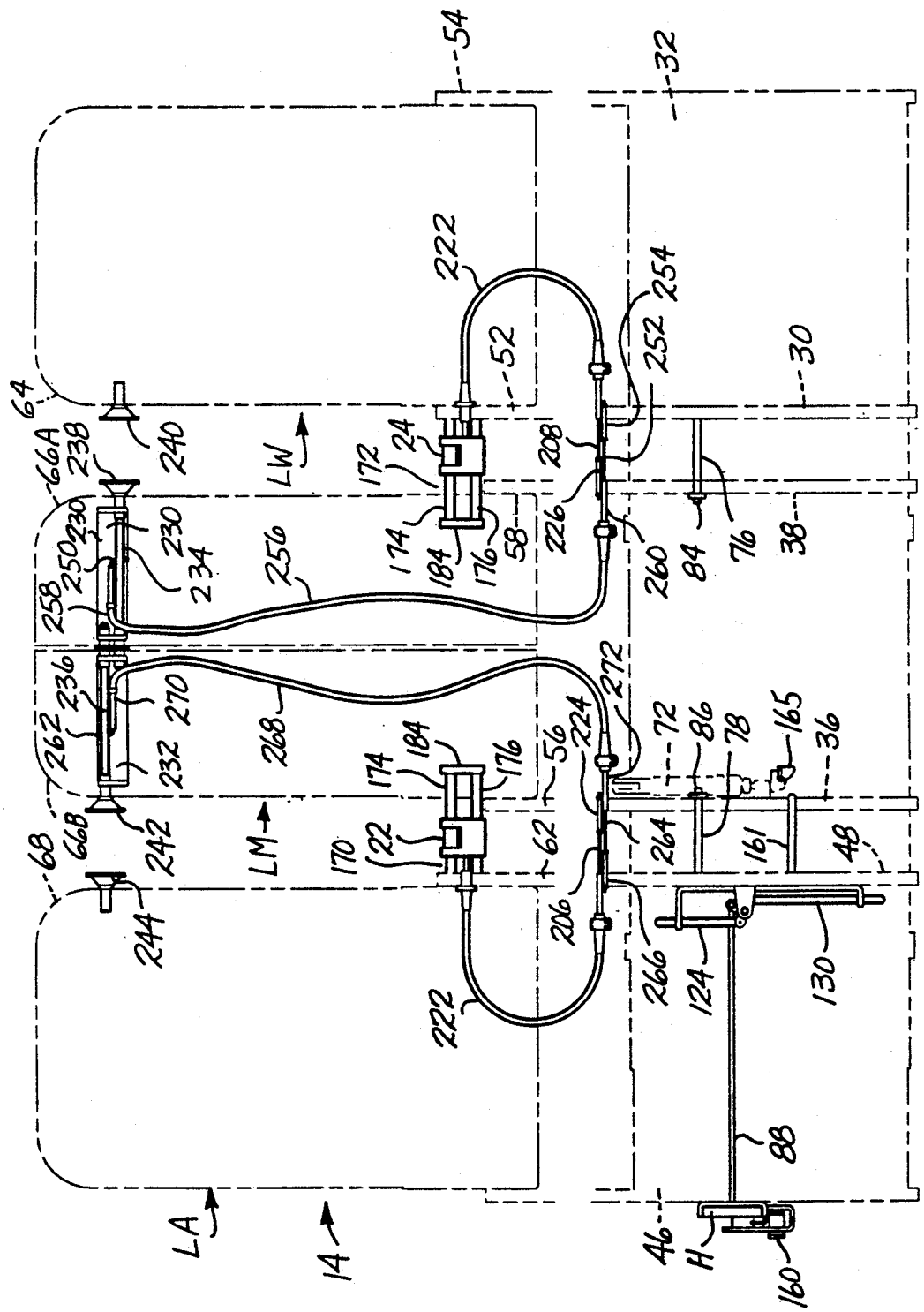
FIG. 12 is a view like FIG. 7, but showing the frame members in phantom line, and showing the positioning components and the armrest support in solid line, such view showing the assembly in the three-seat configuration.

Referring to FIGS. 7 and 12-15, position rods 76, 78 are connected to frame members 30, 36, respectively. Rod 76 is connected at a first end 80 to frame member 30. Rod member 78 is connected at a first end 82 to frame member 48. Rods 76, 78 extend parallel to the direction of movement of the movable aisle seat frame assembly and middle seat frame assembly. Rod 76 includes a stop 84 at its second end. Rod 78 includes a stop 86 at its second end. As shown in FIG. 12, when the seat assembly is in its two-seat configuration, stop 84 is spaced from frame member 38 and stop 86 is spaced from frame member 36. As will hereinafter be described in detail, a flight attendant or other service person can change the seat configuration from a two-seat configuration to a three-seat configuration by merely pulling on the aisle seat LA. In response to the pull, aisle seat LA moves away from the middle seat LM until stop 86 contacts frame member 36. Once contact is made, the two seats LA, LM are coupled together by the contact of stop 86 with member 36. A continuing pull on aisle seat LA causes additional movement of the aisle seat LA and in addition cause movement of the middle seat LM. This movement will continue until stop 84 contacts frame member 38. This contact is shown in FIGS. 7, 12 and 14. When stop 84 contacts frame member 38, while stop 86 is in contact with frame member 36, the aisle and middle seats LA, LM will have reached their end of extension. They will have reached their positions in the three-seat configuration of the seat assembly 14.

Figure 10:
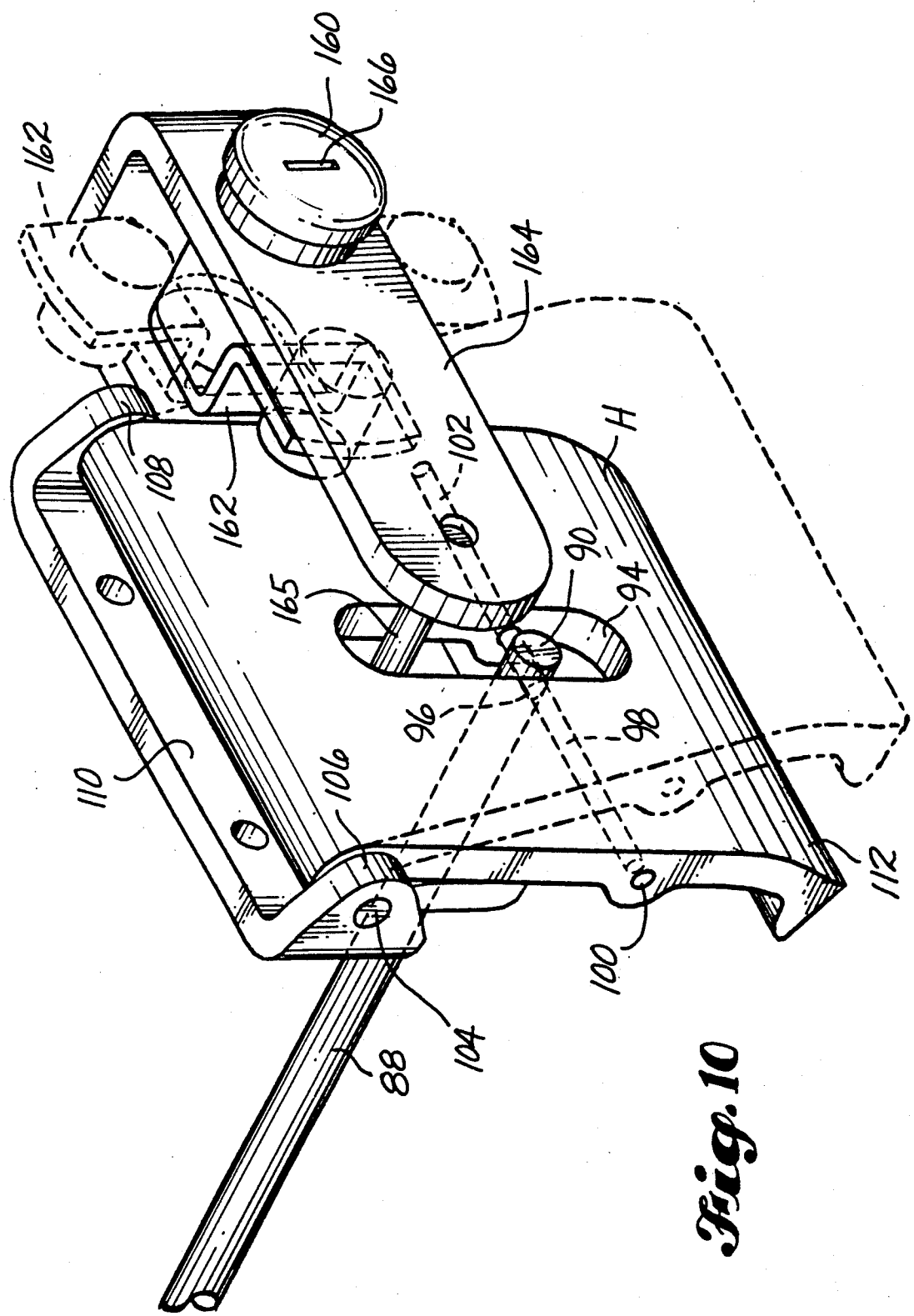
FIG. 10 is a fragmentary pictorial view of a control handle and lock mechanism carried by the aisle seat, such view including a solid line showing of the handle and lock in a locked position and a broken like showing of the handle and lock in an unlocked position.

As shown by FIGS. 7 and 12-15, the seat assembly 14 includes a lock mechanism for locking it in both the two-seat configuration and the three-seat configuration. As best shown by FIGS. 14 and 15, the lock mechanism L includes a main control rod 88 having an aisle end 90 and an opposite end 92. As shown by Figs. 10 and 11, a handle H is provided at the aisle end of rod 88. A vertical slot 96 is formed in handle H. The aisle end 90 of rod 88 projects into the slot 94. A transverse opening 96 is formed in the aisle end portion of rod 88. A pivot pin 98 extends across slot 94 and through opening 96. Pivot pin 98 has end portions which are received within passages 100, 102 formed in handle H. The upper end of handle H is connected by a pivot pin 104 to the ears 106, 108 of a support bracket 110. Support bracket 110 is secured to frame member 46. Handle H has a lower portion 112 which is graspable by a person's hand, for purposes of pulling the handle from the solid line position shown in FIG. 10 (broken line in FIG. 11) to the broken line position shown in FIG. 10 (solid line in FIG. 11). A pull on handle H exerts an endwise pull on control rod 88, towards the aisle of the aircraft. A push on handle H pushes control rod 88 in the opposite direction. In preferred form, handle H is retracted by tension spring 115. End portion 92 of control rod 88 is pivotally connected at 114 to a first arm 116 of a three arm linkage 118. A second arm 120 is pivotally connected at 122 to a first end of a first lock bolt 124. In similar fashion, a third arm 126 of linkage 118 is pivotally connected at 128 to a second lock bolt 130. In the illustrated embodiment, arms 120, 128 extend in opposite directions from a pivot pin 132. Arm 116 extends perpendicular from the arms 120, 126. The pivot pin 132 connects linkage 118 to a support structure 134 which is attached to frame member 58. Support structure 134 may comprise a pair of ears, on opposite sides of the linkage 118, with the pivot pin 132 extending through the two ears and the linkage 118. A guide member 136 is connected to frame member 48. Guide member 136 includes a first arm 138 and a second arm 140. Arms 138, 140 include guide openings 142, 144 through which the lock bolts 124, 130 extend.

Figure 13:
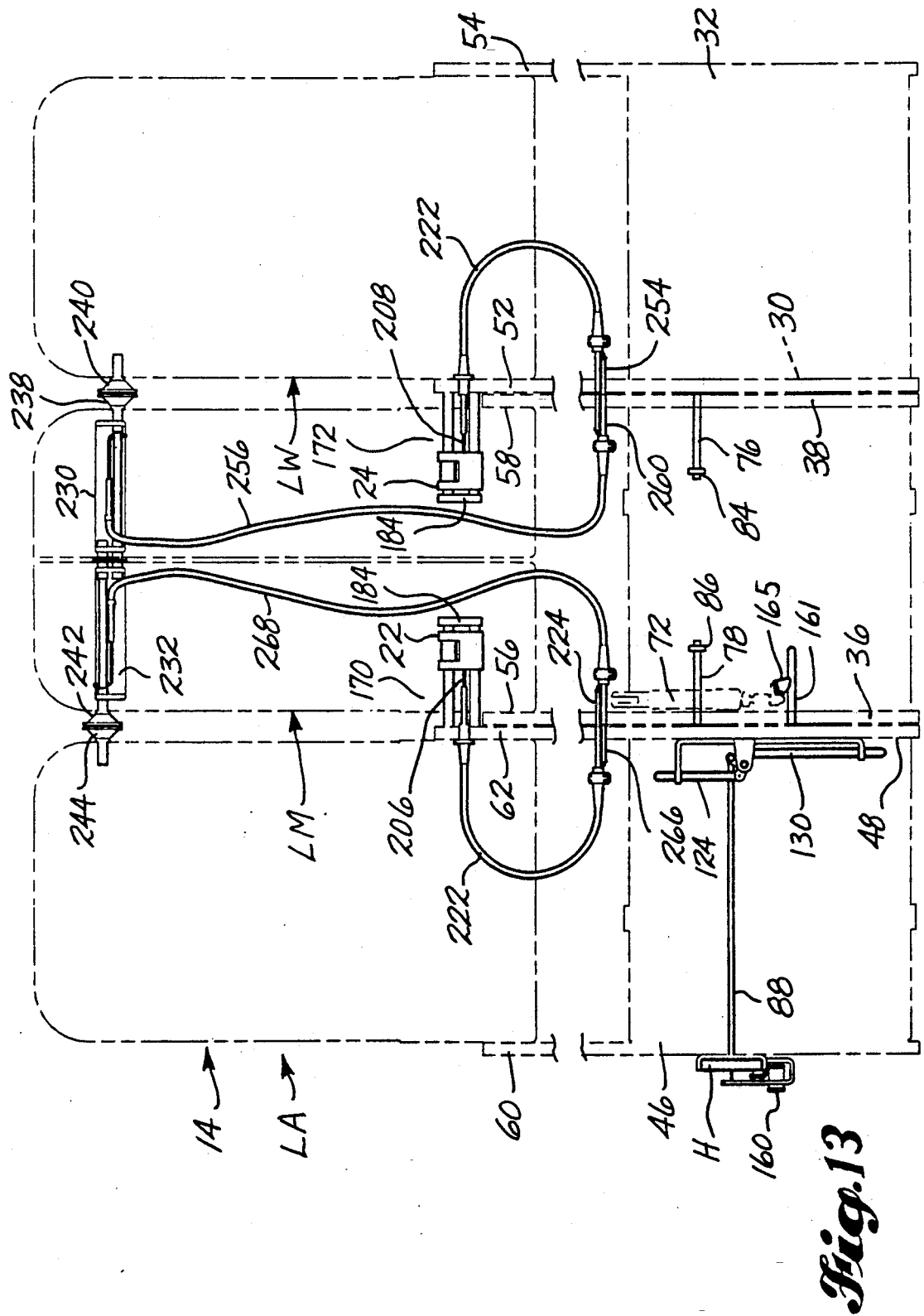
FIG. 13 is a view like FIG. 12, but showing the assembly in a two-seat configuration.

Let it be assumed that the seat assembly 114 is in its three-seat configuration and it is desired to move it into its two-seat configuration. The attendant need only grasp handle H and pull it upwardly, from its "in" position (solid lines in FIG. 10) to its "out" position (broken lines in FIG. 10). This movement of handle H exerts a pull on control rod 88 which in turn exerts a pull on linkage arm 116. In response, linkage 118 rotates counterclockwise (as viewed in FIG. 14). As arms 120, 126 move, they retract lock bolts 124, 130, moving them out from aligned openings in tubular members 28, 44 and 26, 42, respectively. The opening in tubular member 28 is designated 146, the opening in tubular member 44 is designated 148. The opening in tubular member 26 is designated 150. The opening in tubular member 42 is designated 152. When the end portions of lock bolts 124, 130 are within the aligned openings 146, 148 and 150, 152, respectively, the frame part 42, 44, 46 is locked against movement relative to frame part LB, 26, 28. The aforementioned contact between frame member 38 and stop 84 and frame member 36 and stop 86 prevents movement of the middle seat frame. When the lock bolts 124, 130 are retracted out from the openings 146, 148 and 150, 152, respectively, the frame assembly 42, 44, 46, 48 is movable towards the window of the aircraft The aisle seat LA will move alone until its frame member 58 contacts frame member 36 of the middle seat LM. An additional push on the aisle seat LA will move the aisle seat LA and the middle seat LM together towards the window seat. This movement will continue until frame member 38 contacts frame member 30 and frame member 48 contacts frame member 36. When contact of these frame members is made, the aisle seat LA and the middle seat LM will be stopped. In addition, the openings 148, 152 in the tubular members 44, 42 will now be in alignment with openings 156, 158 in tubular members 28, 26. Also, lock bolt 124 is now aligned with openings 148, 156 and lock bolt 130 is now aligned with openings 158, 152. All the attendant has to do is to push the handle H downwardly from its "out" position to its "in" position. The push on handle H exerts a push on control rod 88 which in turn rotates linkage 118 in the clockwise direction (as pictured in FIG. 14). In preferred form, lock bolts 124, 130 are biased into a locked position by tension spring 115. In response, arms 122, 126 move to extend the lock bolts 124, 130. The seat assembly is now locked into its two-seat configuration (FIGS. 13 and 15).

Preferably, the handle assembly (FIG. 10) includes a key lock 160 which rotates a filler element 162 into and out from a position between arm 164 and the handle H. When filler 162 is positioned between arm 164 and handle H, the handle H is locked against movement out from its "in" position. Prior to making a change in the seat configuration, the cabin attendant must insert a key into key slot 166 and then rotate the key clockwise to rotate the filler 162 out from between arm 164 and handle H. When filler 162 is moved out of the way, the attendant can grasp the handle and pull it outwardly and upwardly, in the manner previously described. Arm 164 is connected to and braced from bracket 110 by a brace rod 165.

Referring to FIGS. 14 and 15, a pin 161 is connected at one end to frame member 48. Pin 161 extends parallel to the direction of seat frame movement. Pin 161 is in alignment with an opening 163 in frame member 36. A cam 165 is pivotally connected at 169 to an end portion of the seat recline cylinder 74. Cam 165 engages a control lever 168 which is connected to a valve. As is known to persons skilled in the art, each seat in an aircraft is provided with a control button which when pushed allows the seat occupant to move the seat back rearwardly or forwardly. A push on the button opens a valve in a port at one end of the unit 72. When the valve is opened, the seat back can be moved in position. When the valve is closed, the seat back is locked against movement by fluid trapped in unit 72. Referring to FIG. 14, when the seat assembly 14 is in its three-seat configuration, the free end of pin 161 is spaced from cam 165. In this position of cam 165 the valve control lever 168 is in a valve closing position. The control button (not shown) is operable to open the valve, to permit seat back movement. When the seat assembly 14 is moved into its two-seat configuration, the pin 161 contacts cam 165 and swings it in position about pivot pin 169 (FIG. 11). The cam 165 moves the control lever, opens the valve, and holds it open. This in effect disables the seat recline unit 72. In the two-seat configuration, seat back control unit 70 is used to control the seat back position of the window seat LW. Seat back control unit 74 is used to control the seat back position of the aisle seat LA. The valve in unit 72 is constantly open so that unit 72 will not prevent movement of the portion of the middle seat LM that is attached to the aisle seat LA. Typical recline control units are disclosed by U.S. Pat. No 3,380,561, granted Apr. 30, 1968; U.S. Pat. No. 3,659,684, granted May 2, 1972; U.S. Pat. No. 3,760,911, granted Sep. 25, 1973; U.S. Pat. No. 3,860,098, granted Jan. 14, 1975; U.S. Pat. No. 3,874,480, granted Apr. 1, 1975 and U.S. Pat. No. 4,155,433, granted May 22, 1979. A pull on cable 165, by use of the built in seat control, including an operator button (not shown), or an inward swing of cam 165, will move control rod 167 to disable the recline unit 72.

Referring to FIGS. 3, 4, 7, 13 and 20, the rear end or base portions of the inside armrests 22, 24 are supported on and by armrest frames 170, 172. Frame 170 is connected at one of its ends to the upper rear portion 62 of frame member 48. Frame 170 projects from frame part 62 laterally of the middle seat LM. Frame 172 is connected at one of its ends to the upper rear part 52 of frame member 30. Frame 172 projects from frame part 52 laterally of the middle seat LM, towards frame 170. As clearly shown in FIG. 13, frames 170, 172 are in axial alignment with each other. Frames 170, 172, and the construction and arrangement of the armrests 22, 24, are identical except for the direction of projection of the frames 170, 172. Accordingly, only frame 170 and armrest 22 will be described, it being realized that the description applies equally as well to frame 172 and armrest 24.

Referring to FIG. 22, frame 170 comprises a pair of guide members 174, 176 which may be cylindrical in shape. End 180 of member 174 is connected to frame part 62. End 182 of frame member 176 is also connected to frame part 62. A cross frame member 184 interconnects the opposite ends 186, 188 of the guide members 174, 176. The base portion 190 of armrest 22 includes a pair of bushings 192, 194. Bushing 192 surrounds guide member 174 and bushing 194 surrounds guide member 176. In preferred form, a sleeve 196 surrounds bushing 192 and a bushing 198 surrounds sleeve 196. Sleeve 196 bridges between opposite side portions 200, 202 which are part of the base 190 of armrest 22. A rear end portion 204 of the armrest arm includes an opening in which the bushing 198 is received. Bushing 198 mounts the armrest arm for pivotal movement between horizontal and vertical positions.

Figure 20:
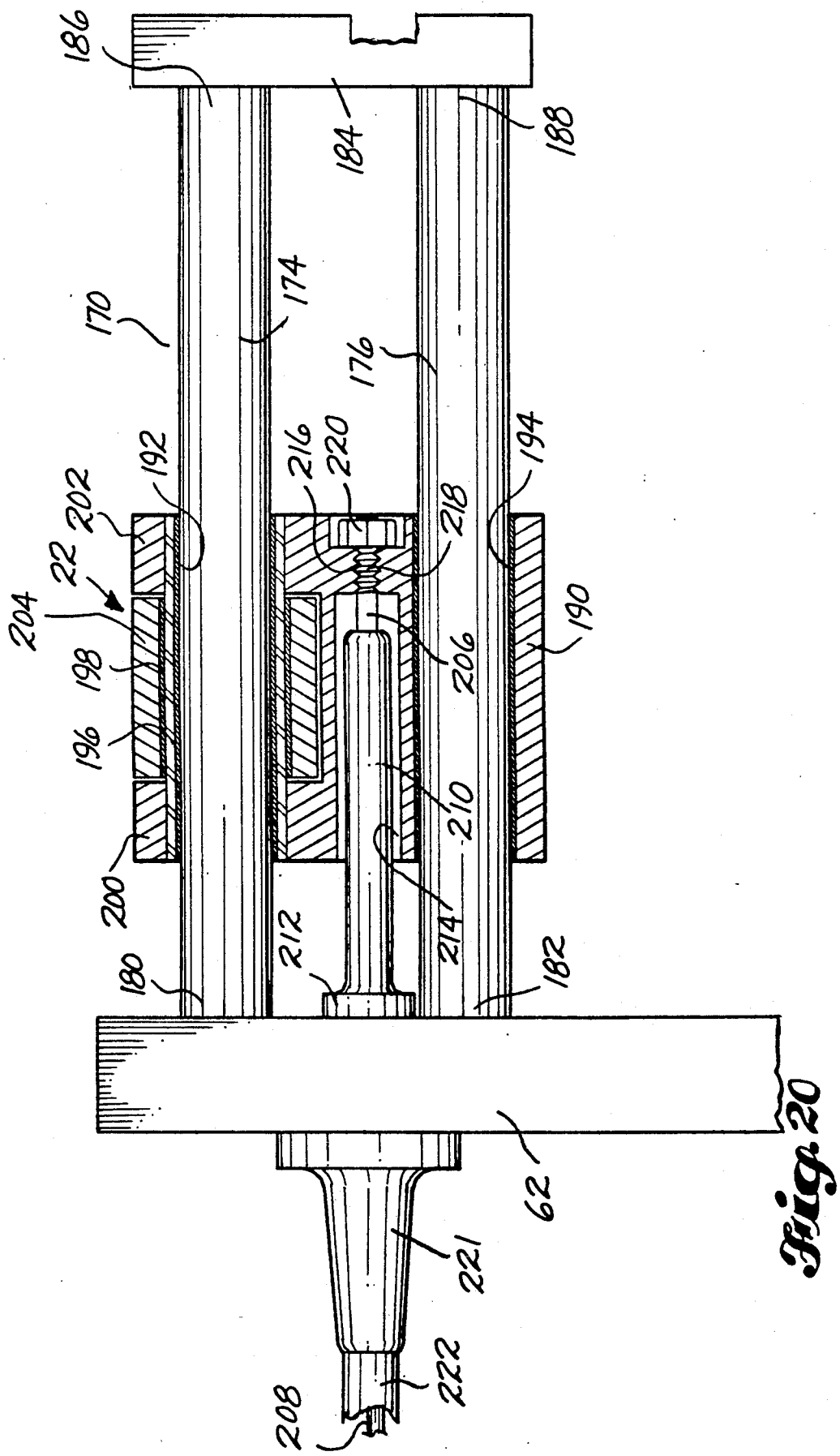
FIG. 20 is an enlarged scale fragmentary view of an armrest support, the armrest and a positioning mechanism for the armrest, with the armrest shown in section.

FIG. 20 shows one end of a push/pull control cable 206 which is anchored to frame member 62. Cable 206 is connected at its end to the armrest base 190. Tubular cable guide 210 is secured at end 212 to the frame member 62. Tubular guide 210 extends into a socket 214 extending horizontally through the armrest base 190. A wall 216 is provided adjacent the end of armrest base 190. A threaded end portion 218 of cable 206 extends through opening 216. A nut 220 threads onto end portion 218 and serves to firmly connect the cable end to the armrest base 190. Cable 206 extends from end 216, 218, 220, through the guide tube 210, through fitting 221 and through guide sheath 222 which extends to a connection to frame member 48 (FIG. 12) The second end of cable 206 is connected to frame member 36 at 224.

The control cable 206 for armrest 24 is connected at its second end to frame member 38 at location 226. Referring to FIG. 12, when the seat assembly 14 is in its three-seat configuration, armrest 22 is substantially centered between the aisle seat LA and the middle seat LM. Armrest 24 is substantially centered between the middle seat LM and the window seat LW. As previously explained, the handle H is unlocked, and is lifted to release the lock bolts 124, 130, and then the aisle seat LA is pushed upon, to move it and the middle seat LM, towards the window seat LW, to place the seat assembly 14 in its two-seat configuration. Movement of anchor 222 towards frame member 30 exerts a push on the cable 208 that is attached to the base portion of armrest 24. The cable 208 moves endwise and shifts the armrest 24 in position towards the cross frame member 184. Movement of frame member 48 towards frame member 36 causes the control cable 206 connected to armrest 22 to push the armrest 22 towards its frame member 184. As shown in FIG. 13, when the seat assembly 14 is in its two-seat configuration, armrest 22 is adjacent its frame member 184 and armrest 24 is adjacent its frame member 184. In other words, both armrests 22, 24 are located adjacent the ends of the frames 170, 172 which are opposite the frame members 62, 52 respectively. The three-seat position of armrest 22 is a position substantially centered between the aisle seat LA and the window seat LM. The three-seat position of armrest 24 is a position substantially centered between the middle seat LM and the window seat LW. The two-seat position of armrest 22 is a position at the middle seat end of frame 170. The two-seat position of armrest 24 is a position substantially at the middle seat end of frame 174. As shown by FIGS. 3-7, 12, 13, 16-19 and 21, the middle seat LM has a vertically split seat back frame 66. Part 66A is adjacent the seat back frame 64 of the window seat LW. Part 66B is adjacent the seat back frame 68 of the aisle seat LA. Frame part 66A includes a vertical frame member 228 which is adjacent the vertical centerline of seat frame 66. Frame part 66B includes a vertical frame member 230 which is also closely adjacent the vertical centerline of seat frame 66. Frame part 66A includes a transverse frame member 230 adjacent its upper end. Frame part 66B includes a transverse frame member 232 adjacent its upper ends. The frame members 230, 232 provide support and guide structure for a pair of lock bolts 234, 236. Lock bolts 234, 236 both extend horizontally. Each lock bolt 234, 236 is movable endwise back and forth between a three-seat position and a two-seat position. A cup 238 is secured to frame part 66A at the window seat end of lock bolt 34. A like cup 240 is secured to the window seat frame 64 in axial alignment with cup 238. A third cup 242 is connected to frame part 66A at the aisle seat end of lock bolt 236. A fourth cup 244 is connected to aisle seat back frame 68 in axial alignment with cup 242. Cups 240, 244 function as funnels to direct end portions of lock bolts 234, 236 into axial openings provided at the bases of the guides 240, 244.

Figure 19:
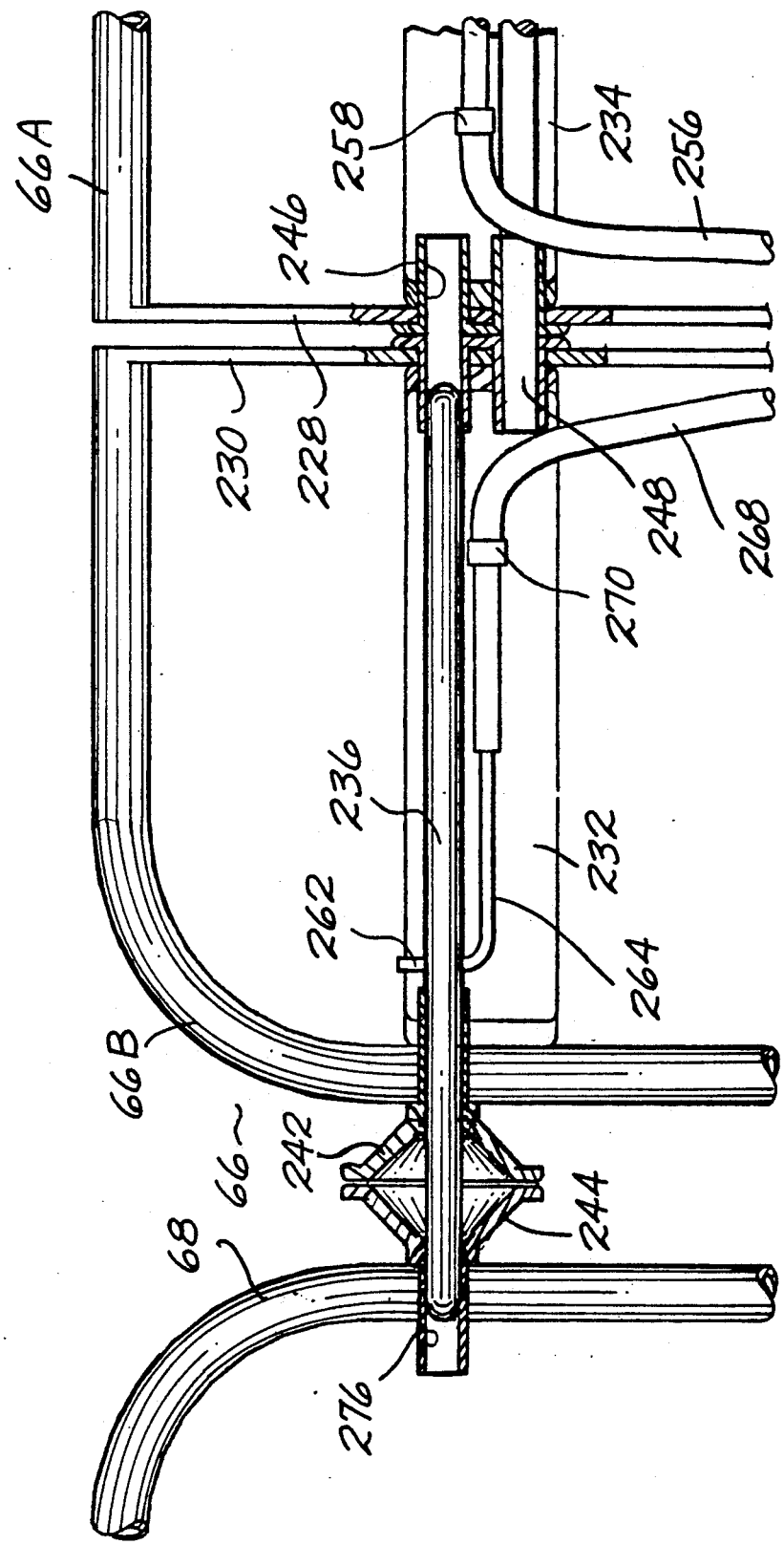
FIG. 19 is a view like FIG. 18, but showing one part of the middle seat back frame coupled to the seat back frame for the aisle seat.

Referring to FIGS. 18 and 19, the end of frame part 230 adjacent frame part 232 includes a lock bolt receiving opening 246. The end of frame member 232 adjacent frame member 234 includes a lock bolt receiving opening 248. Openings 246, 248 are in axial alignment when the seat back frame parts 66A, 66B are at the same inclination. Referring to FIGS. 12 and 13, the first end 250 of a push/pull control cable 252 is connected to a mid portion of lock bolt 234. The second end of cable 252 is connected to frame member 30 at 254. Cable 252 extends through a sheath 256 which is connected at an upper end 258 to frame member 230 and at a lower end 260 to frame member 38. In similar fashion, the first or upper end 262 of a push/pull cable 264 is connected to a mid portion of lock bolt 236. The second end of cable 264 is connected to frame member 48 at 266. Control cable 264 extends through a sheath 268. The upper end of sheath 268 is connected to frame member 232 at 270. The lower end of sheath 268 is connected to frame member 236 at 272.

Referring to FIGS. 12 and 16, when the seat assembly 14 is in its three-seat configuration, the inner end of lock bolt 236 is within opening 246 and the inner end of lock bolt 234 is within opening 248. This locks the frame parts 66A, 66B together, so that they will move together during changes in inclination of the seat back frame 66. In other words, seat back frame parts 66A, 66B are connected together to provide a single seat back frame 66 for the middle seat LM. As shown by FIG. 12, cable sheath anchor 260 is spaced from cable end connection 254. Cable sheath anchor 272 is spaced from cable end anchor 266. When the aisle and middle seats LA, LM are pushed towards the window seat LW, to put the seat assembly 14 into its two-seat configuration, frame member 38 moves towards frame member 30 and frame member 48 moves towards frame member 36. In response, cable 252 moves relatively through its sheath 256 and moves lock bolt 234 towards the window seat LW. Cable 264 moves through its sheath 268 and moves lock bolt 232 towards aisle seat LA. The outer end of lock bolt 234 enters into opening 274 in seat back frame 64 and at the same time the inner end of lock bolt 234 is withdrawn from opening 248. In like fashion, the outer end of lock bolt 236 enters into opening 276 in seat back frame 68 and at the same time the inner end of lock bolt 236 moves out from opening 246. Thus, seat back frame part 66 becomes locked to seat back frame 64 and seat back frame part 66B becomes locked to seat back frame 68. This is done automatically in response to the aisle seat LA and the middle seat LM being moved towards the window seat LW. As previously described, this movement also automatically disables the incline unit 72 for the middle seat LM. In the two-seat configuration, the inclination of seat back frame part 66A is controlled by the inclination unit 70 for the window seat LW. The inclination of seat back frame part 66B is controlled by the inclination unit 74 for the aisle seat LA. The inclination unit 72 is disabled and stays disabled until the seat assembly 14 is changed back to its three-seat configuration.

Figure 5:
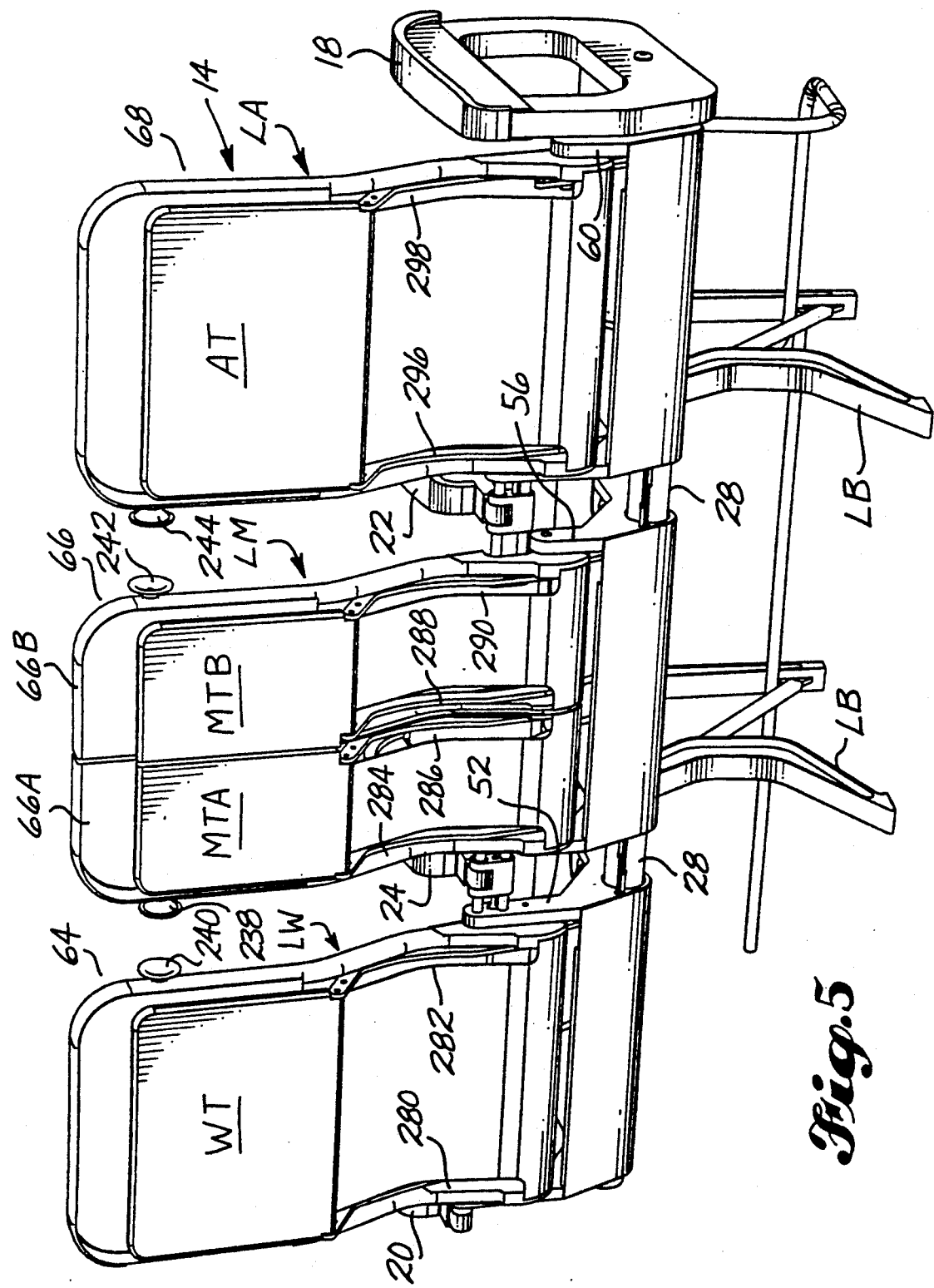
FIG. 5 is a pictorial view looking towards the rear of the frame structure, showing the frame structure in the three-seat configuration.
Figure 6:
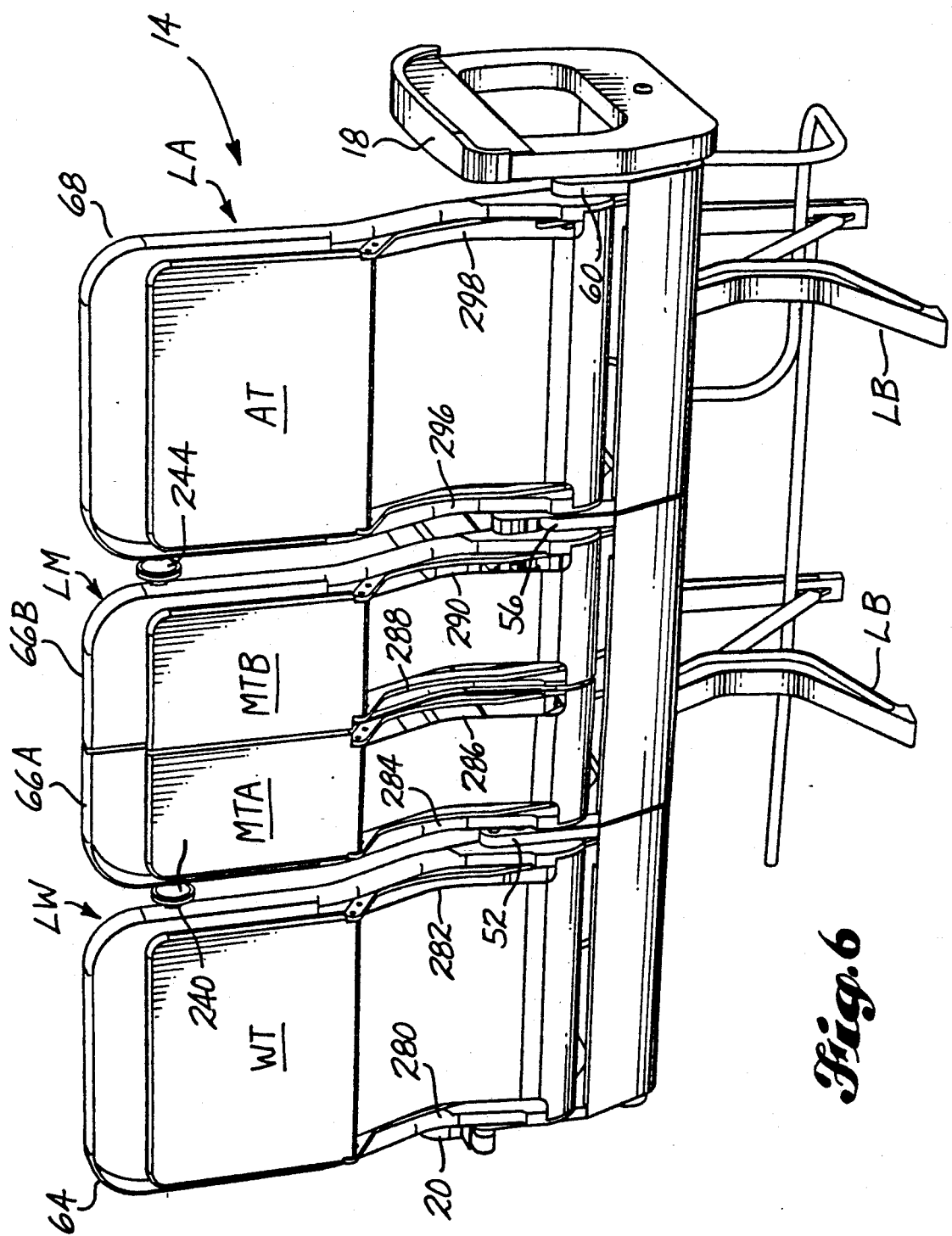
FIG. 6 is a view like FIG. 5, but showing the frame structure in a two-seat configuration.

Referring to FIGS. 5, 6 and 21, the seat back 64 for the window seat LW includes a window tray WT. The middle seat includes a two part tray, with the parts being designated MTA, MTB. The aisle seat LA includes an aisle seat tray AT. The window seat tray WT may be a conventional tray, having the support surface S1 and a pair of support arms 280, 282. In a known manner, the window seat tray WT is movable between a stowed position (FIGS. 5 and 6) and an in-use position (FIG. 21). The middle seat tray parts MTA, MTB are supported by arms 284, 286, 288, 290. The support surfaces S2, S3 are supported for sideways movement along rods 292, 294. Rod 292 is interconnected between arms 284, 286 and rod 294 is interconnected between arms 288, 290. The aisle seat table AT includes a single support surface S4 which is supported by arms 296, 298. Specifically, support surface S4 is supported for sideways movement along a rod 300 which is interconnected between arms 296, 298.

If a given seat assembly 14 is in a two-seat configuration, as shown in FIG. 21, and the seat assembly 14 behind it is also in the same two-seat configuration, the passenger sitting in the window seat LW of the rear seat assembly will use the tray WT on the back of the window seat LW in front of him or her. The passenger sitting in the aisle seat of the rear seat assembly 14 will use the tray AT on the back of the aisle seat LA in front of him or her. The middle seat tray parts MTA, MTB will not be used. When both seat assemblies 14 are in a three-seat configuration, the passengers in the rear seats will use the trays in front of them. The passenger in the middle rear seat will use tray parts MTA, MTB. If the front seat assembly 14 is in a two-seat configuration, as shown in FIG. 21, and the seat assembly 14 behind, it is in a three-seat configuration, tray AT is slid sideways into the broken line position and tray parts MTA, MTB are slid sideways into the broken line position.

In summary of the foregoing, the present invention provides a seat assembly which is convertible from a three-seat configuration to a two-seat configuration by a simple push on the aisle seat. The same seat assembly is convertible from the two-seat configuration to the three-seat configuration by a simple pull on the aisle seat. The movement of the aisle and middle seat frames automatically shifts the two inside armrests into the positions they occupy in the new seat configuration. Movement of the seats from the three-seat configuration to the two-seat configuration automatically separates the two parts of the seat back frame for the middle seat and connects one to the middle seat back frame and the other to the aisle seat back frame. A reverse movement disconnects, the middle seat back parts from the window and aisle seat back frames and connects the middle seat back parts together at the end of movement. Movement of the seats from the three-seat configuration into the two-seat configuration automatically disables the recline unit for the middle seat. A reverse movement automatically reactivates the recline unit for the middle seat.

The constructional details which are illustrated and described constitute a presently preferred construction in the best mode of the invention presently known to the inventors. However, such construction is presented for purposes of illustrating the invention and not for purposes of limitation. The invention is defined by the appended claims which are to be interpreted in accordance with established rules of patent claim interpretation, including use of the doctrine of equivalents.

What is claimed is:

1. An aircraft passenger seat assembly convertible between a first seat configuration and a second seat configuration, said assembly comprising:
   a support base;
   a seat cushion support frame on said support base, including a fixed window frame portion, a movable middle frame portion, and a movable aisle frame portion, said middle frame portion being movable towards and away from the window frame portion, and said aisle frame portion being movable towards and away from the middle frame portion, whereby the middle frame portion can be moved against the window frame portion, and the aisle frame portion against the middle frame portion, to position the seat assembly into the first configuration, and the middle frame portion can be moved away from the window frame portion, and the aisle frame portion away from the middle frame portion, to position the seat assembly into the second configuration; and
   lock means for locking the movable frame portions against movement, following movement of said frame portions into a selected one of said seat configurations.

2. An aircraft passenger seat assembly according to claim 1, wherein said lock means includes a handle carried by the aisle frame portion, said handle being movable between a first position in which the lock means locks the movable frame portions against movement, and a second position in which the lock means is unlocked and the movable frame portions are movable, to change the configuration of the seat assembly.

3. An aircraft passenger seat assembly according to claim 2, wherein said lock means includes an elongated control member having an outer end to which the handle is connected, wherein a pull on the handle exerts a pull on the control member, to move the lock means into an unlocked position, and a push on the handle exerts a push on the control member, and moves the lock means towards its lock position.

4. An aircraft passenger seat assembly according to claim 3, wherein the control member includes a second end opposite the handle, and wherein said lock means includes at least one lock bolt guided for back and forth endwise movement, and linkage interconnecting said control member and said lock bolt, and wherein a pull on the control member will move the linkage to cause a lengthwise movement of the lock bolt in a first direction, and a push on the control member will move the linkage to cause an endwise movement of the lock bolt in a second direction.

5. An aircraft passenger seat assembly according to claim 4, wherein a pull on the handle exerts a pull on the control member which in turn swings the linkage to move the lock bolt from its locked position into its unlocked position, and a push on said handle moves the control member endwise to swing the linkage in the opposite direction and move the lock bolt from its unlocked position towards its locked position.

6. An aircraft passenger seat assembly according to claim 5, wherein the seat cushion support frame includes a fixed first member, and said movable aisle seat frame member includes a second member which is adjacent the first member, said first member having a lateral opening, and said second member having a first lateral opening which is in alignment with the lateral opening in the first member when the seat assembly is in its first configuration, and a second lateral opening spaced from the first lateral opening which is in alignment with the lateral opening in the first member when the seat assembly is in its second configuration, and wherein the lock bolt includes an end portion which is movable into the openings to lock the second member against movement relative to the first member, and movable out from said openings to permit movement of the second member relative to the first member.

7. An aircraft passenger seat assembly according to claim 6, wherein said fixed first member and said movable second member are tubular members telescopically joined together.

8. An aircraft passenger seat assembly according to claim 2, wherein said handle includes an upper portion that is pivotally attached to an outer end part of the movable aisle frame portion, and a lower portion which is graspable by one hand, said first end of said control member being connected to said handle, so that an upward pull on the lower part of the handle will swing the handle upwardly and will move the control member endwise outwardly, to swing the linkage and move the lock bolt from a locked position into an unlocked position.

9. An aircraft passenger seat assembly according to claim 2, wherein said handle includes an upper portion that is pivotally attached to an outer end part of the movable aisle frame portion, and a lower portion which is graspable by one hand, and wherein said lock means includes an elongated control member having an outer end connected to said handle, so that an upward pull on the lower part of the handle will swing the handle upwardly and will pull the control member endwise outwardly, wherein a pull on the handle and control member moves the lock means into an unlocked position, and a push on the handle and control member moves the lock means towards its locked position.

10. An aircraft passenger seat assembly according to claim 9, wherein the control member includes a second end opposite the handle, and wherein said lock means includes at least one lock bolt guided for back and forth endwise movement, and linkage interconnecting said control member and said lock bolt, and wherein a pull on the handle will pull the control member and the control member will move the linkage to cause a lengthwise movement of the lock bolt in a first direction, to move the lock bolt into an unlocked position, and a push on the handle will move the control member to move the linkage and cause an endwise movement of the lock bolt towards its locked position.

11. An aircraft passenger seat assembly convertible between a first seat configuration and a second seat configuration, said assembly comprising:
a support base;
a seat cushion support frame on said support base, including a fixed window frame portion, a movable middle frame portion, and a movable aisle frame portion, said middle frame portion being movable towards and away from the window frame portion, and said aisle frame portion being movable towards and away from the middle frame portion, whereby the middle frame portion can be moved against the window frame portion, and the aisle frame portion against the middle frame portion, to position the seat assembly into the first configuration, and the middle frame portion can be moved away from the window frame portion, and the aisle frame portion away from the middle frame portion, to position the seat assembly into the second configuration;
said window frame portion including a side frame member on its aisle side, said middle frame portion including a side frame member on its window side and a side frame member on its aisle side, and said aisle frame portion including a side frame member on its aisle side, wherein the side frame member on the window side of the middle frame portion contacts the side frame member on the aisle side of the window frame portion and the side frame member on the window side of the aisle frame portion contacts the side frame member on the aisle side of the middle frame portion when the seat assembly is in its first configuration.

12. An aircraft passenger seat assembly according to claim 11, further comprising a first spacer having a first end connected to the window frame portion and a second end including a first stop, and a second spacer having a first end connected to the aisle frame portion and a second end including a second stop, said first and second spacers extending in the direction of movement of the aisle and middle frame portions, whereby a pull on the aisle frame portion will move it away from the middle frame portion until the second stop contacts the middle frame portion, and then a further pull on the aisle frame portion will move the aisle frame portion and the middle frame portion together, away from the window frame portion, until contact is made between the middle frame portion and the first stop, wherein said contact is made between the middle frame portion and the first and second stops when the seat assembly is in its second configuration.

13. An aircraft passenger seat assembly convertible between three side-by-side seats of a first seat spacing and two side-by-side seats of a second wider seat spacing, said assembly comprising:
a fixed window seat frame portion;
a movable middle seat frame portion;
a movable aisle seat frame portion;
said middle seat frame portion being movable towards and away from the window seat frame portion, and said aisle seat frame portion being movable towards and away from the middle seat frame portion, whereby the middle seat frame portion can be moved away from the window seat frame portion, and the aisle seat frame portion away from the window seat frame portion, to provide window, middle and aisle seats having a first spacing, and said middle seat frame portion can be moved towards the window seat frame portion, and the aisle seat frame portion towards the middle seat frame portion, to define two passenger seats having a second wider spacing;
a first armrest support frame connected to the window seat frame portion;
a second armrest support frame connected to the aisle seat frame portion;
a first armrest on the first armrest support frame, movable laterally of the seat assembly between a first position and a second position;
a second armrest on the second armrest support frame, movable laterally of the seat assembly between a first position and a second position; and
push/pull control members interconnected between the middle seat frame portion and the first and second armrests, for automatically moving the armrests into their first positions in response to movement of the aisle seat frame portion and the middle seat frame portion to place the seat assembly into its three-seat configurations, and for automatically moving the armrests into their second positions in response to movement of the aisle seat frame portion and the middle seat frame portion to place the seat assembly into its two-seat configurations.

14. An aircraft passenger seat assembly according to claim 13, wherein the first armrest support frame comprises an elongated guideway extending from the window seat frame portion towards the middle seat frame portion, said second armrest support frame comprises an elongated guideway extending from the aisle seat frame portion towards the middle seat frame portion, said first armrest includes a base portion supported for sliding movement along the guideway, and said second armrest includes a base portion supported for sliding movement along the guideway of the second armrest support frame.

15. An aircraft passenger seat assembly convertible between three side-by-side seats of a first seat spacing and two side-by-side seats of a second wider seat spacing, comprising:
a fixed window seat frame portion;
a movable middle seat frame portion;
a movable aisle seat frame portion;
said middle seat frame portion being movable towards and away from the window seat frame portion, and said aisle seat frame portion being movable towards and away from the middle seat frame portion, whereby the middle seat frame portion can be moved away from the window seat frame portion, and the aisle seat frame portion can be moved away from the window seat frame portion, to provide window, middle and aisle seats having a first spacing, and said middle seat frame portion can be moved towards the window seat frame portion, and the aisle seat frame portion can be moved towards the middle seat frame portion, to define two passenger seats having a second wider spacing;
said middle seat frame portion including a middle seat back frame comprising a first part and a second part; and
connector means for connecting the two parts of the middle seat back frame together, when the seat frame portions are spaced positioned to provide three seats of the first seat spacing, and for connecting said first part of the middle seat back frame to the window seat frame portion, and said second part to the aisle seat frame portion, when the frame portions are positioned to provide two seats.

16. An aircraft passenger seat assembly according to claim 15, wherein the connector means comprises first and second sliding lock bolts, said first lock bolt being carried by the first part of the middle seat back frame, and said second lock bolt being carried by the second part of the middle seat back frame, each said lock bolt being slidable endwise laterally of the seat assembly, between a first position and a second position.

17. An aircraft passenger seat assembly convertible between three side-by-side seats of a first seat spacing and two side-by-side seats of a second wider seat spacing, comprising:
a fixed window seat frame portion;
a movable middle seat frame portion;
a movable aisle seat frame portion;
said middle seat frame portion being movable towards and away from the window seat frame portion, and said aisle seat frame portion being movable towards and away from the middle seat frame portion, whereby the middle seat frame portion can be moved away from the window seat frame portion, and the aisle seat frame portion can be moved away from the window seat frame portion, to provide window, middle and aisle seats having a first spacing, and said middle seat frame portion can be moved towards the window seat frame portion, and the aisle seat frame portion can be moved towards the middle seat frame portion, to define two passenger seats having a second wider spacing;
said middle seat frame portion including a middle seat back frame comprising a first part and a second part; and
connector means for connecting the two parts of the middle seat back frame together, when the seat frame portions are spaced positioned to provide three seats of the first seat spacing, and for connecting said first part of the middle seat back frame to the window seat frame portion, and said second part to the aisle seat frame portion, when the frame portions are positioned to provide two seats;
wherein the connector means comprises first and second sliding lock bolts, said first lock bolt being carried by the first part of the middle seat back frame, and said second lock bolt being carried by the second part of the middle seat back frame, each said lock bolt being slidable endwise laterally of the seat assembly, between a first position and a second position; and
wherein said first lock bolt has first and second opposite end portions, and the second lock bolt has first and second opposite end portions, wherein the window seat frame portion includes an opening in alignment with the first end of the first lock bolt, and said aisle seat frame portion includes an opening in alignment with the first end of the second lock bolt, wherein the second part of the middle seat back frame includes an opening in alignment with the second end of the first lock bolt, and wherein the first part of the middle seat back frame includes an opening in alignment with the second end of the second lock bolt, wherein the first lock bolt is movable endwise to place its first end into the opening in the window seat frame portion and the second lock bolt is movable endwise to place its first end into the opening in the aisle seat frame portion, so as to lock the first part of the seat back frame to the window seat frame portion to lock the second part of the seat back frame to the aisle seat frame portion.

18. An aircraft passenger seat assembly according to claim 17, wherein the first lock bolt is movable endwise to place its second end in the opening in the second part of the middle seat back frame, and the second lock bolt is movable endwise to place its second end in the opening in the first part of the middle seat back frame.

19. An aircraft passenger seat assembly according to claim 17, comprising a push/pull control element interconnected between the first lock bolt and the window seat frame portion, and a second push/pull control element interconnected between the second lock bolt and the aisle seat frame portion, said push/pull element serving to automatically shift the lock bolts to connect the first part of the middle seat back frame to the window seat frame portion and the second part of the middle seat back frame to the aisle seat frame portion, when the seat frame portions are positioned in the two-seat configuration, and to automatically shift the slide bolts to lock together the two parts of the middle seat back frame when the seat frame portions are moved into the three-seat configuration.

20. An aircraft passenger seat assembly convertible between three side-by-side seats of a first seat spacing and two side-by-side seats of a second wider seat spacing, said assembly comprising:
a fixed window seat frame portion;
a movable middle seat frame portion;
a movable aisle seat frame portion;
said middle seat frame portion being movable towards and away from the window seat frame portion, and said aisle seat frame portion being movable towards and away from the middle seat frame portion, whereby the middle seat frame portion can be moved away from the window seat frame portion, and the aisle seat frame portion away from the window seat frame portion, to provide window, middle and aisle seats having a first spacing, and said middle seat frame portion can be moved towards the window seat frame portion, and the aisle seat frame portion towards the middle seat frame portion, to define two passenger seats having a second wider spacing;
a first armrest positioned between the window seat frame portion and the middle seat frame portions, supported for movement between a three-seat position and a two-seat position;
a second armrest positioned between the middle seat frame portion and the aisle seat frame portion, supported for movement between a three-seat position and a two-seat position;
a first push/pull control member interconnected between the middle seat frame portion and the first armrest;
a second push/pull control member interconnected between the middle seat frame portion and the second armrest, said first and second push/pull control members automatically shifting the armrest into a two-seat position when the aisle seat frame portion and the middle seat frame portion are shifted to place the seat assembly into a two-seat configuration, and said first and second control members automatically moving the armrest into a three-seat position when the aisle seat frame portion and the middle seat frame portion are shifted to place the seat assembly into its three-seat configuration.

21. An aircraft passenger seat assembly according to claim 20, wherein the middle seat frame portion includes a middle seat back frame comprising a first part adjacent the window seat frame portion and a second part adjacent the aisle seat frame portion, lock bolt means for connecting the two parts of the middle seat back frame together when the seat assembly is in a three-seat configuration, and for connecting the first part to the window seat frame portion and the second part to the aisle seat frame portion when the seat assembly is in its two-seat configuration, and push/pull control means for automatically shifting the lock bolt means to lock the two parts of the middle seat back frame together in response to movement of the aisle seat frame portion and the middle seat frame portion to put the seat assembly into its three-seat configuration, and to automatically unlock the two parts from each other and lock the first part to the window seat frame portion and the second part to the aisle seat frame portion, in response to movement of the aisle seat frame portion and the middle seat frame portion to place the seat assembly into its two-seat configuration.

22. An aircraft passenger seat assembly according to claim 21, comprising lock means for locking the movable frame portions against movement, following movement of said frame portions into a selected one of said seat configurations.

23. An aircraft passenger seat assembly according to claim 22, wherein said lock means include a handle carried by the aisle seat frame portion, said handle being movable between a first position in which the lock means locks the movable frame portions against movement, and a second position in which the lock means is unlocked and the movable frame portions are movable, to change the configuration of the seat assembly.

24. An aircraft passenger seat assembly according to claim 23, further comprising a first spacer having a first end connected to the window seat frame portion and a second end including a first stop, and a second spacer having a first end connected to the aisle seat frame portion and a second end including a second stop, said first and second spacers extending in the direction of movement of aisle and middle seat frame portions, whereby a pull on the aisle seat frame portion will move it away from the middle seat frame portion until the second stop contacts the middle frame portion, and then a further pull on the aisle seat frame portion will move the aisle seat frame portion and the middle seat frame portion together, away from the window seat frame portion, until contact is made between the middle seat frame portion and the first stop, wherein said contact is made between the middle frame portion and the first and second stops when the seat assembly is in its second configuration.

25. An aircraft passenger seat assembly according to claim 24, wherein the middle seat frame portion contacts the window seat frame portion and the aisle seat frame portion contacts the middle seat frame portion, when the aisle seat frame portion and the middle seat frame portion are positioned to place the seat assembly into its two-seat configuration.

* * * * *